（12）United States Patent
Schumacher et al.

（10）Patent No.: US 11,336,181 B2
（45）Date of Patent: *May 17, 2022

（54）DC TO DC CONVERTER SOURCING VARIABLE DC LINK VOLTAGE

（71）Applicant: THERMO KING CORPORATION

（72）Inventors: Ryan Wayne Schumacher, Bloomington, MN (US); Johannes Hendricus Vissers, Boskant (NL); Cas Bakker, Nuenen (NL)

（73）Assignee: Thermo King Corporation, Minneapolis, MN (US)

（*）Notice: Subject to any disclaimer, the term of this patent is extended or adjusted under 35 U.S.C. 154(b) by 0 days.

This patent is subject to a terminal disclaimer.

（21）Appl. No.: 17/072,281

（22）Filed: Oct. 16, 2020

（65）Prior Publication Data

US 2021/0036615 A1 Feb. 4, 2021

Related U.S. Application Data

（63）Continuation of application No. 15/713,171, filed on Sep. 22, 2017, now Pat. No. 10,840,807.

（51）Int. Cl.
*H02M 3/158* (2006.01)
*H02M 3/337* (2006.01)
(Continued)

（52）U.S. Cl.
CPC ........... *H02M 3/158* (2013.01); *F25B 49/025* (2013.01); *H02M 3/337* (2013.01);
(Continued)

（58）Field of Classification Search
CPC ....... H02M 2003/1552; H02M 3/1584; H02M 3/1582; H02M 3/3353; H02M 3/158;
(Continued)

（56）References Cited

U.S. PATENT DOCUMENTS 7,049,774 B2 5/2006 Chin et al.
8,149,603 B2 4/2012 Huang et al.
(Continued)

FOREIGN PATENT DOCUMENTS

DE 102007003415 7/2008
EP 3346595 7/2018
(Continued)

OTHER PUBLICATIONS

Extended European Search Report, cited in the corresponding European Patent Application No. 18195293.8, dated Jan. 30, 2019, 12 pages.

*Primary Examiner* — Bickey Dhakal
（74）*Attorney, Agent, or Firm* — Hamre, Schumann, Mueller & Larson, P.C.

（57）ABSTRACT

An inverter-converter system includes a DC source, a DC to DC boost converter, a DC link capacitor, an inverter circuit, a variable speed electric machine, and a controller. The DC to DC boost converter receives an input DC voltage from the DC source. The inverter circuit converts the variable boosted voltage to an AC voltage to drive the variable speed electric machine. The controller senses a plurality of parameters from the variable speed electric machine, and controls the DC to DC boost converter to boost up the input DC voltage to a variable output voltage based on the plurality of parameters and/or the voltage (or load) needed by the variable speed electric machine. The design of the inverter-converter system can achieve an electrical efficiency and cost savings for the overall system.

18 Claims, 11 Drawing Sheets

(51) Int. Cl.
*F25B 49/02* (2006.01)
*H02M 3/335* (2006.01)
*H02P 27/06* (2006.01)
*H02M 7/48* (2007.01)
*H02M 1/00* (2006.01)

(52) U.S. Cl.
CPC ........ *H02M 3/33576* (2013.01); *H02P 27/06* (2013.01); *F25B 2600/021* (2013.01); *F25B 2600/0253* (2013.01); *H02M 1/007* (2021.05); *H02M 1/0077* (2021.05); *H02M 7/48* (2013.01)

(58) Field of Classification Search
CPC .. H02M 3/337; H02M 3/33576; H02M 1/007; H02M 1/0077; H02M 7/48; F25B 49/025; F25B 2600/021; F25B 2600/0253; H02P 27/06
See application file for complete search history.

(56) References Cited

U.S. PATENT DOCUMENTS

| | | |
|---|---|---|
| 8,228,025 B2 | 7/2012 | Ho et al. |
| 8,981,686 B2 | 3/2015 | Becerra et al. |
| 9,742,336 B2 | 8/2017 | Jeon et al. |
| 2006/0055363 A1 | 3/2006 | Patel et al. |
| 2010/0226149 A1 | 9/2010 | Masumoto |
| 2016/0141951 A1* | 5/2016 | Mao .................... H02M 1/4225 363/21.02 |
| 2017/0054376 A1* | 2/2017 | Quigley ............ H02M 3/33507 |

FOREIGN PATENT DOCUMENTS

| | | |
|---|---|---|
| JP | 2003-304688 | 10/2003 |
| JP | 2008-199808 | 8/2008 |
| WO | 2006090111 | 8/2006 |

* cited by examiner

DC TO DC CONVERTER SOURCING VARIABLE DC LINK VOLTAGE

FIELD

This disclosure relates generally to the power management of a direct current (DC) to direct current converter (DC to DC converter) for a heating, ventilation, air conditioning, and/or refrigeration systems (HVACR). More specifically, the disclosure relates to devices, systems and methods for efficiently sourcing a multiple DC link voltage to drive a variable speed electric machine in an HVACR system.

BACKGROUND

A boost converter is a DC to DC converter that changes a source (i.e. input) voltage to an output voltage greater than the source voltage. The source voltage can be any suitable DC source, such as a rectifier, a DC generator, a battery, a solar panel, etc. A typical switch-mode boost converter includes an inductor, a switch, and a flywheel diode. The switch is can be a Metal-Oxide-Semiconductor Field-Effect Transistor (MOSFET), an Insulated Gate Bipolar Transistor (IGBT), or a Bipolar Junction Transistor (BJT), or the like. The flywheel diode can be replaced by a MOSFET. A typical boost converter can boost a fixed source voltage to a fixed output voltage.

SUMMARY

This disclosure relates generally to the power management of a DC to DC converter for powering systems such as, for example, a climate system. The climate system can be an HVACR system. More specifically, the disclosure relates to devices, systems and methods for efficiently sourcing a multiple DC link voltage to drive a variable speed electric machine in an HVACR system. The embodiments disclosed herein can be used in transport refrigeration units, used in vehicle battery systems, and/or in auxiliary electrical energy storage systems, or the like.

In some embodiments, an inverter-converter system for an HVACR system includes a DC to DC boost converter, a DC source providing an input DC voltage to the DC to DC boost converter, a controller, and a variable speed electric machine. The controller is configured to obtain a plurality of sensed parameters, for example, a load of the variable speed electric machine, to control the DC to DC boost converter to generate one of a first boosted voltage and a second boosted voltage based on the sensed plurality of parameters.

In some embodiments, the DC to DC boost converter includes a first boost circuit that has a first electromagnetic coil. The DC to DC boost converter further includes a second boost circuit that has a second electromagnetic coil. The DC to DC boost converter also includes a switch set. In one embodiment, the switch set can be N-type metal-oxide-semiconductor (NMOS) switch elements.

In some embodiments, the first electromagnetic coil and/or the second electromagnetic coil can be a tapped winding electromagnetic coil with or without a magnetic core. In another embodiment, the first electromagnetic coil and/or the second electromagnetic coil can be a flyback transformer with or without magnetic core.

In some embodiments, the energy storage magnetics, for example, the inductors, can have multiple taps available. The taps can be chosen to optimize the amount of inductance required by the DC to DC boost converter to lower power losses in the DC to DC boost converter. A tap can be accompanied by a pair of switch elements. For each additional tap of the magnetics, an additional pair of switch elements would be required. If an upstream tap is not required, the pair of switch elements for that tap is turned off. To perform the boost function, the DC to DC boost converter would have to be synchronous rectification with the pair of switch elements for their corresponding tap/inductor.

In one embodiment, a DC to DC boost converter for an HVACR system is disclosed. The DC to DC boost converter includes a first boost circuit having a first electromagnetic coil, a second boost circuit having a second electromagnetic coil, and a switch set. The switch set is operable in a first voltage state and a second voltage state. The first electromagnetic coil is connected to the second electromagnetic coil in series when the switch set operates in the second voltage state. When the switch set operates in the first voltage state, the first boost circuit is configured to boost an input DC voltage to a first boosted voltage. When the switch set operates in the second voltage state, the first boost circuit and the second boost circuit are configured to boost the input DC voltage to a second boosted voltage. The first boosted voltage is different from the second boosted voltage.

In another embodiment, an inverter-converter system for an HVACR system is disclosed. The inverter-converter system includes a DC to DC boost converter. The DC to DC boost converter includes a first boost circuit having a first electromagnetic coil, a second boost circuit having a second electromagnetic coil, and a switch set. The switch set is operable in a first voltage state and a second voltage state. The first electromagnetic coil is connected to the second electromagnetic coil in series when the switch set operates in the second voltage state. When the switch set operates in the first voltage state, the first boost circuit is configured to boost an input DC voltage to a first boosted voltage. When the switch set operates in the second voltage state, the first boost circuit and the second boost circuit are configured to boost the input DC voltage to a second boosted voltage. The first boosted voltage is different from the second boosted voltage. The inverter-converter system also includes a DC source providing the input DC voltage to the DC to DC boost converter, a variable speed electric machine, and a controller that determines a load of the variable speed electric machine and controls the switch set based on the sensed load of the variable speed electric machine. The DC to DC boost converter is configured to source one of the first boosted voltage and the second boosted voltage to the variable speed electric machine based on the sensed load of the variable speed electric machine.

In yet another embodiment, a method for operating a DC to DC boost converter is disclosed. The DC to DC boost converter includes a first boost circuit having a first electromagnetic coil, a second boost circuit having a second electromagnetic coil, and a switch set. The switch set is operable in a first voltage state and a second voltage state. The first electromagnetic coil is connected to the second electromagnetic coil in series when the switch set operates in the second voltage state. The method includes receiving an input DC voltage from a DC source, and sensing a load of a variable speed electric machine. The method further includes operating the switch set in the first voltage state and the first boost circuit boosting the input DC voltage to the first boosted voltage when the load of the variable speed electric machine is sensed to require a first boosted voltage. The method also includes operating the switch set in the second voltage state and the first boost circuit combined with the second boost circuit boosting the input DC voltage to the second boosted voltage when the load of the variable speed electric machine is sensed to require a second boosted voltage.

An advantage of the inverter-converter system as described herein can be to optimize the electrical efficiency by using multiple winding electromagnetic coils in the DC to DC boost converter to provide multiple boosted voltages to a DC link to drive a variable speed electric machine. A multiple output voltage DC to DC boost converter (that can generate variable boosted voltages) can have much higher efficiency than a single output voltage boost converter. Based on optimum operation points of the variable speed electric machine, the DC to DC boost converter can be designed to generate optimum boosted voltages with optimum windings of the electromagnetic coils.

Another advantage of the inverter-converter system as described herein can be to optimize the efficiency for the variable speed electric machine at partial load, which can make up a significant portion of the overall runtime of the variable speed electric machine. The inverter-converter system can include a DC link capacitor. The boosted voltage by the DC to DC boost converter and the capacitance of the DC link capacitor can be designed for a highest load and highest voltage operation of the variable speed electric machine. At a lower load and lower voltage operation of the variable speed electric machine, such design could have extra design margin (for example, an extra capacitance design margin) that could lead to an increased life time of the components, for example, an increased life time of the DC link capacitor.

Yet another advantage of the inverter-converter system as described herein can be to achieve optimum performance or maximum efficiency of using the energy source, for example, a battery with limited capacity to ultimately drive the variable speed electric machine in an Auxiliary Power Unit (APU) application for a vehicle HVACR system. Another advantage of the inverter-converter system as described herein can be to achieve optimum or maximum system efficiency to meet emissions laws.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTIONS

This disclosure relates generally to the power management of a DC to DC converter for powering systems such as, for example, a climate system. The climate system can be an HVACR system. More specifically, the disclosure relates to devices, systems and methods for efficiently sourcing a multiple DC link voltage to drive a variable speed electric machine in an HVACR system. The embodiments disclosed herein can be used in transport refrigeration units, used in vehicle battery systems, and/or in auxiliary electrical energy storage systems, or the like.

Figure 1A:
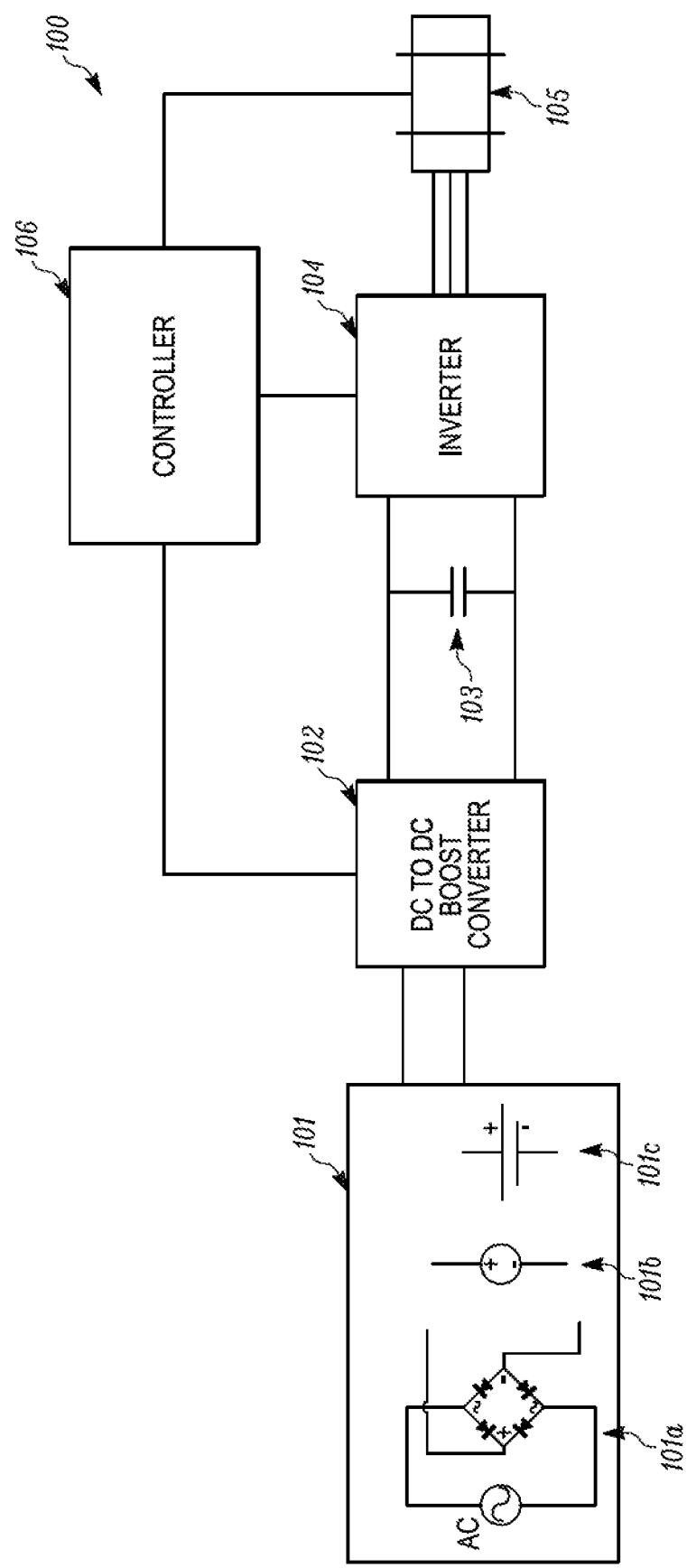
FIG. 1A is a schematic illustration of an inverter-converter system for an HVACR system, according to one embodiment.

FIG. 1A is a schematic illustration of an inverter-converter system 100 for an HVACR system, according to some embodiments. The inverter-converter system 100 includes a DC source 101, a DC to DC boost converter 102, a DC link capacitor 103, an inverter circuit 104, a variable speed electric machine 105, and a controller 106. It will be appreciated that in other embodiments, the DC link capacitor 103 can be part of the DC to DC boost converter 102.

The DC source 101 provides an input DC voltage to the DC to DC boost converter 102. The DC to DC boost converter 102 receives the input DC voltage from the DC source 101. In FIG. 1A, the DC source 101 can be a rectified alternating current (AC) shore power source 101a, a vehicle DC power supply 101b, or a DC battery 101c. The rectified AC shore power source 101a can come from, for example, a 120 volts, 220 volts, or 240 volts input. In one embodiment, the vehicle DC power supply 101b can be an alternator coupled to, for example, a prime mover of the vehicle. In will be appreciated that the DC source 101 is not limited to the examples discussed above and can be any suitable DC power source. In one embodiment, the input DC voltage provided by the DC source 101 can be 12 volts. In other embodiments, the input DC voltage can be any suitable DC voltage, for example, 24 volts or 48 volts.

The DC to DC boost converter 102 boosts up the input DC voltage from the DC source 101 to a variable output voltage to the DC link capacitor 103. In one embodiment, the DC to DC boost converter 102 can boost the input DC voltage boost voltage to, for example, 170 volts. In another embodiment, the DC to DC boost converter 102 can boost the input DC voltage boost voltage to, for example, 340 volts. It will be appreciated that in other embodiments, the DC to DC boost converter 102 can boost the input DC voltage to any suitable voltage (for example, 170 volts, 240 volts, 300 volts, 340 volts, 350 volts, etc.) as required for desired application. In some embodiments, the DC to DC boost converter 102 can include a first DC to DC converter (not shown) that converts the input voltage to 12 volts, and a second DC to DC converter (not shown) that boosts up the 12 volts input voltage to a variable output voltage, with the variable output voltage being sent to the DC link capacitor 103.

The DC link capacitor 103 stores the power obtained from the DC to DC boost converter 102 while the power is being converted back to AC power via the inverter circuit 104. In some embodiments, for a one kilo-watts operation, the DC link capacitor 103 can be in a range of at or about 0.1 millifarad to at or about 2 millifarad for a voltage from at or about 250 volts to at or about 500 volts.

The inverter circuit 104 converts the boosted voltage outputted by the DC to DC boost converter 102 to an AC voltage to drive the variable speed electric machine 105. In some embodiments, the inverter circuit 104 (sometimes called an inverter bridge) can include switches (not shown). The switches can be controlled on and/or off to generate a variable power (for example, variable frequency, variable current, variable voltage, etc.) from an input DC voltage (i.e. the boosted voltage outputted by the DC to DC boost converter 102) to drive the variable speed electric machine 105. Matching the AC voltage and the voltage needed by the variable speed electric machine 105 can be an efficient way to utilize the energy from the DC source 101, and converting a full boosted voltage to a corresponding AC voltage can be an efficient conversion for the inverter circuit 104. The embodiments described herein can get a lower boosted voltage from the DC link capacitor 103 (i.e. from the DC to DC boost converter 102) when the voltage needed by the variable speed electric machine 105 is low, and get a higher boosted voltage from the DC link capacitor 103 (i.e. from the DC to DC boost converter 102) when the voltage needed by the variable speed electric machine 105 is high. The embodiments described herein can have a controller 106 to control the DC to DC boost converter 102 to generate a variable boosted voltage based on the voltage (or load) needed by the variable speed electric machine 105.

The variable speed electric machine 105 is driven by the AC voltage from the inverter circuit 104. In some embodiments, the variable speed electric machine 105 can be, for example, a compressor (not shown), a fan, etc. In some embodiments, the compressor can be a variable speed compressor for a vehicle HVACR system. In other embodiments, the compressor can be a two-speed compressor for an HVACR system that includes a high speed/power for providing rapid cooling or heating to a space and a low speed/power for maintaining a desired temperature in the space. In one embodiment, the two-speed compressor can be a three-phase AC compressor that requires 280 volts at high speed/power and requires 140 volts at low speed/power. In another embodiment, the two-speed compressor can be a three-phase AC compressor that requires 240 volts at high speed/power and requires 120 volts at low speed/power. In general, a higher load on the variable speed electric machine 105 can require a higher speed and/or a higher voltage to drive the variable speed electric machine 105 and a lower load on the variable speed electric machine 105 can require a lower speed and/or a lower voltage to drive the variable speed electric machine 105.

The controller 106 controls the DC to DC boost converter 102 based on the voltage (or load) needed by the variable speed electric machine 105. In one embodiment, the controller 106 can receive data from a plurality of sensors (not shown). The plurality of sensors can monitor a plurality of parameters such as, for example, a mechanic torque requirement of the variable speed electric machine 105 (for example, a load on the variable speed electric machine 105), an optimum power requirement (for example, voltage, current, and/or frequency) of the variable speed electric machine 105, a calculated (or rated) speed of the variable speed electric machine 105, an output AC voltage of the inverter circuit 104, an output current of the inverter circuit 104, an output frequency of the inverter circuit 104, etc. The controller 106 can control the DC to DC boost converter 102 based on any or all of the sensed parameters. Details for controlling the DC to DC boost converter 102 using the controller 106 can be found in the description of FIGS. 2-8 below.

In one embodiment, the variable speed electric machine 105 can be integrated to a hermetic compressor that can be used in an APU in an HVACR system for a vehicle, for example, a semi-truck. The compressor can run at a multiple speeds based on the load on the compressor. The APU can be operated when a main prime mover of the vehicle is turned off such as, for example, when a driver parks the vehicle for an extended period of time to rest. The APU can provide, for example, power to operate a secondary HVACR unit to provide conditioned air to a cabin of the vehicle. The APU can also provide power to operate cabin accessories within the cabin such as a television, a microwave, a coffee maker, a refrigerator, etc. The compressor can run at a high speed (that requires a higher input voltage) to operate the secondary HVACR system at a high capacity provide rapid temperature control (e.g., cooling) to the cabin. The compressor can run at a low speed (that requires a lower input voltage) to operate the secondary HVACR system at a low capacity to maintain a temperature within the cabin. In some embodiments, the low speed mode can be the predominant operation mode of the compressor. It will be appreciated that generally the APU can operate more efficiently (e.g., require less energy) when the compressor is running at low speed regardless of whether the APU is a mechanically driven APU (e.g., prime mover driven) or an electrically driven APU (e.g., battery driven). For a mechanically driven APU, the prime mover can require less fuel (e.g., be more fuel efficient) when the compressor is operating at low speed versus operating at high speed. For an electrically driven APU, less energy from the battery may be required when the compressor is operating at low speed versus operating at high speed. It will be appreciated that generally operating at lower speed can result in more run time. Also, regardless of whether the APU is mechanically or electrically driven, the APU can have a limited run time based on the amount of fuel stored or based on battery capacity. Accordingly, the embodiments described herein can improve the efficiency and reduce the energy loss of the compressor and extend the battery longevity.

Figure 1B:
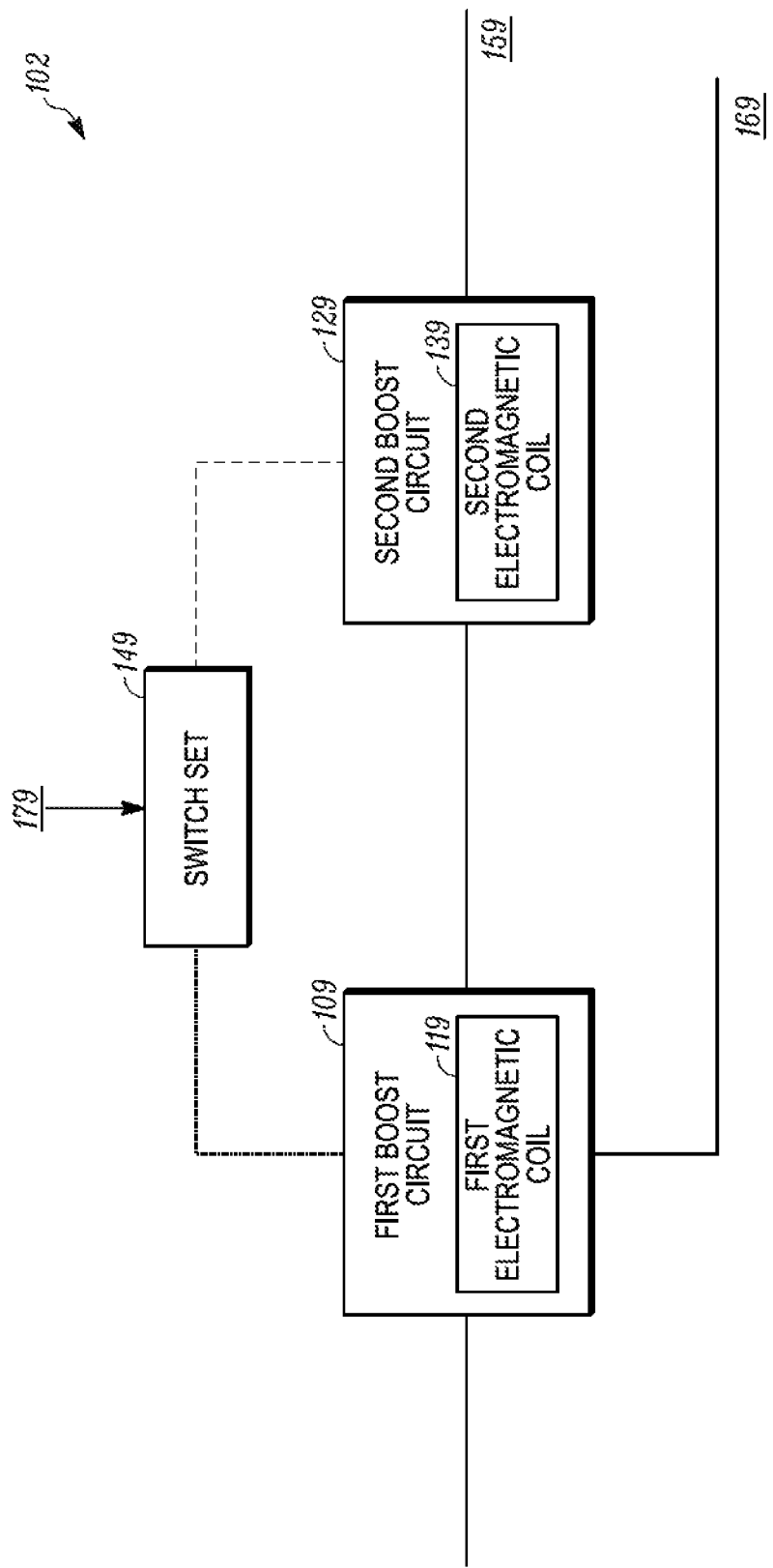
FIG. 1B illustrates a schematic view of a DC to DC boost converter of the inverter-converter system shown in FIG. 1A, according to one embodiment.

FIG. 1B illustrates a schematic view of the DC to DC boost converter 102 for inverter-converter system 100, according to one embodiment. The DC to DC boost converter 102 includes a first boost circuit 109, a second boost circuit 129, and a switch set 149. The first boost circuit 109 includes a first electromagnetic coil 119. The second boost circuit 129 includes a second electromagnetic coil 139. The switch set 149 is operable in a first voltage state and a second voltage state. A controller (for example, the controller 106 shown in FIG. 1A) can control the switch set 149 in the first voltage state and the second voltage state via a control signal 179.

In operation, when the switch set 149 operates in the first voltage state, the first boost circuit 109 is configured to boost an input DC voltage (for example, 12 volts, 24 volts, or 48 volts) to a first boosted voltage 169 (for example, 150 volts or 170 volts), and the second boost circuit 129 is not used. When the switch set 149 operates in the second voltage state, the first electromagnetic coil 119 is connected to the second electromagnetic coil 139 in series. The first boost circuit 109 and the second boost circuit 129 are configured to boost an input DC voltage to a second boosted voltage 159 (for example, 300 volts or 340 volts).

The DC-DC boost converter 102 can work with an inverter (e.g., the inverter 104 shown in FIG. 1A). The DC-DC boost converter 102 can be designed in a way that optimizes the electromagnetic coils (119, 139) so that the DC-DC boost converter 102 has two (or more) stages (for example, the first boost circuit 109 and the second boost circuit 129). Instead of using two (or more) DC-DC boost converters, a single DC-DC boost converter 102 can be used. The controller 106 can control the switch set 149 to either use two stages for a high boosted voltage or one of the two stages for a low boosted voltage.

The electromagnetic coils (119 and/or 139) can be inductors, transformers, or the like. Some embodiments of the DC to DC boost converter 102 can be found in the descriptions of FIGS. 2-8. It will be appreciated that the DC to DC boost converter 102 can be extended to an nth degree. For example, the DC to DC boost converter 102 can include a third boost circuit. The third boost circuit can be substantially the same as the second boost circuit 129. The DC to DC boost converter 102 can include an nth boost circuit. The nth boost circuit can be substantially the same as the second boost circuit 129. It is noted that the embodiments shown in FIGS. 2-8 are merely exemplary and it will be appreciated that other embodiments may be achieved without departing from the scope of this disclosure.

Figure 2:
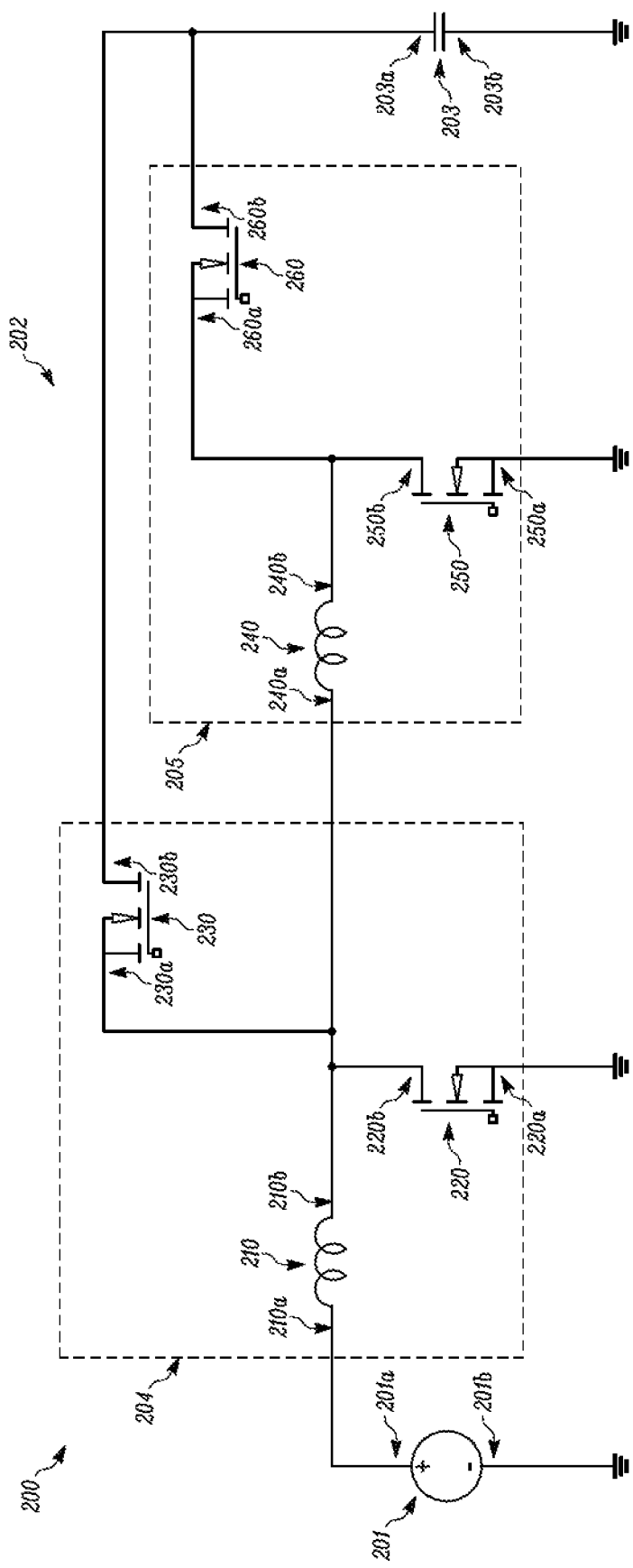
FIG. 2 is a circuit diagram of a DC to DC boost converter in a boost converter unit for an HVACR system, according to a first embodiment.

FIG. 2 is a circuit diagram of a DC to DC boost converter 202 in a boost converter unit 200 for an HVACR system, according to a first embodiment. The boost converter unit 200 includes a DC power supply 201, a DC to DC boost converter 202, and a DC link capacitor 203. The DC to DC boost converter 202 includes a first boost circuit 204 and a second boost circuit 205. The structure and function of the DC power supply 201 can be similar to the he DC source 101 in FIG. 1A. The structure and function of the DC link capacitor 203 can be similar to the DC link capacitor 103 in FIG. 1A. The structure and function of the DC to DC boost converter 202 can be similar to the DC to DC boost converter 102 in FIG. 1A.

Returning to FIG. 2, the first boost circuit 204 includes a first inductor 210 and a first set of switches (a first switch element 220 and a second switch element 230). The second boost circuit 205 includes a second inductor 240 and a second set of switches (a third switch element 250 and a fourth switch element 260). It will be appreciated that inductance value of the inductors can depend on specific application requirements and, for example, input and output voltages, output current and ripple, switching frequency, etc. In some embodiments, the first inductor 210 and the second inductor 240 can be tapped winding magnetics. In some embodiments, the switch elements 220, 230, 250, and 260 can be one or more of a Metal-Oxide-Semiconductor Field-Effect Transistor (MOSFET), Insulated Gate Bipolar Transistor (IGBT), Bipolar Junction Transistor (BJT) or the like.

In FIG. 2, the DC power supply 201 includes a positive electrode 201a and a negative electrode 201b. The first inductor 210 includes a first end 210a and a second end 210b. The second inductor 240 includes a first end 240a and a second end 240b. The first switch element 220 includes a source terminal 220a and a drain terminal 220b. The second switch element 230 includes a source terminal 230a and a drain terminal 230b. The third switch element 250 includes a source terminal 250a and a drain terminal 250b. The fourth switch element 260 includes a source terminal 260a and a drain terminal 260b. The DC link capacitor 203 includes a first end 203a and a second end 203b.

In FIG. 2, the drain terminal 230b of the second switch element 230 and the drain terminal 260b of the fourth switch element 260 connect to the first end 203a of the DC link capacitor 203. The source terminal 220a of the first switch element 220, the source terminal 250a of the third switch element 250, and the negative electrode 201b of the DC power supply 201 connect to the second end 203b of the DC link capacitor 203. The drain terminal 205b of the third switch element 250 and the source terminal 260a of the fourth switch element 260 connect to the second end 240b of the second inductor 240. The second end 210b of the first inductor 210, the drain terminal 220b of the first switch element 220, and the source terminal 230a of the second switch element 230 connect to the first end 240a of the second inductor 240. The positive electrode 201a of the DC power supply 201 connects to the first end 210a of the first inductor 210. In one embodiment, the negative electrode 201b of the DC power supply 201 can be grounded.

A controller (for example, the controller 106 shown in FIG. 1A) can control the switch elements 220, 230, 250, and 260 based on a plurality of parameters sensed by a plurality of sensors (not shown) and sent to the controller. In operation, based on the sensed parameters, when a first boosted voltage, a medium (or low) voltage, for example, 170 volts, is needed corresponding to a medium (or low) speed requirement of the variable speed electric machine, the controller can turn the second set of switches (switch element 250 and switch element 260) off. The first boost circuit 204 (including the first inductor 210, the first switch element 220, and the second switch element 230) can boost the input DC voltage to the first boosted voltage. In such scenarios, the second inductor 240 is disconnected (i.e. not used) from the circuit. During boosting, the controller can control or command the switch elements 220 and/or 230 to charge the first inductor 210 and to change the state to transfer energy from the first inductor 210 into the DC link capacitor 203.

In operation, based on the sensed parameters, when a second boosted voltage, a high voltage, for example, 340 volts, is needed corresponding to a high speed requirement of the variable speed electric machine, the controller can turn the first set of switches (switch element 220 and 230) off. The first inductor 210 and the second boost circuit 205 (including the second inductor 240, the third switch element 250, and the fourth switch element 260) can boost the input DC voltage to the second boosted voltage. In such scenarios, the first inductor 210 and the second inductor 240 are connected (or used) in series. During boosting, the controller can control or command the switch elements 250 and/or 260 to charge the first inductor 210 and the second inductor 240 and to change the state to transfer energy from the first inductor 210 and the second inductor 240 into the DC link capacitor 203. Compared with using one boost circuit for high voltage and another boost circuit for low voltage, the design shown in FIG. 2 (i.e. the combination of the first inductor 210 and the second inductor 240 for high voltage and the use of first inductor 210 for low voltage) could save parts (for example, inductor) since the cost and/or weight of inductors can be high.

Figure 3:
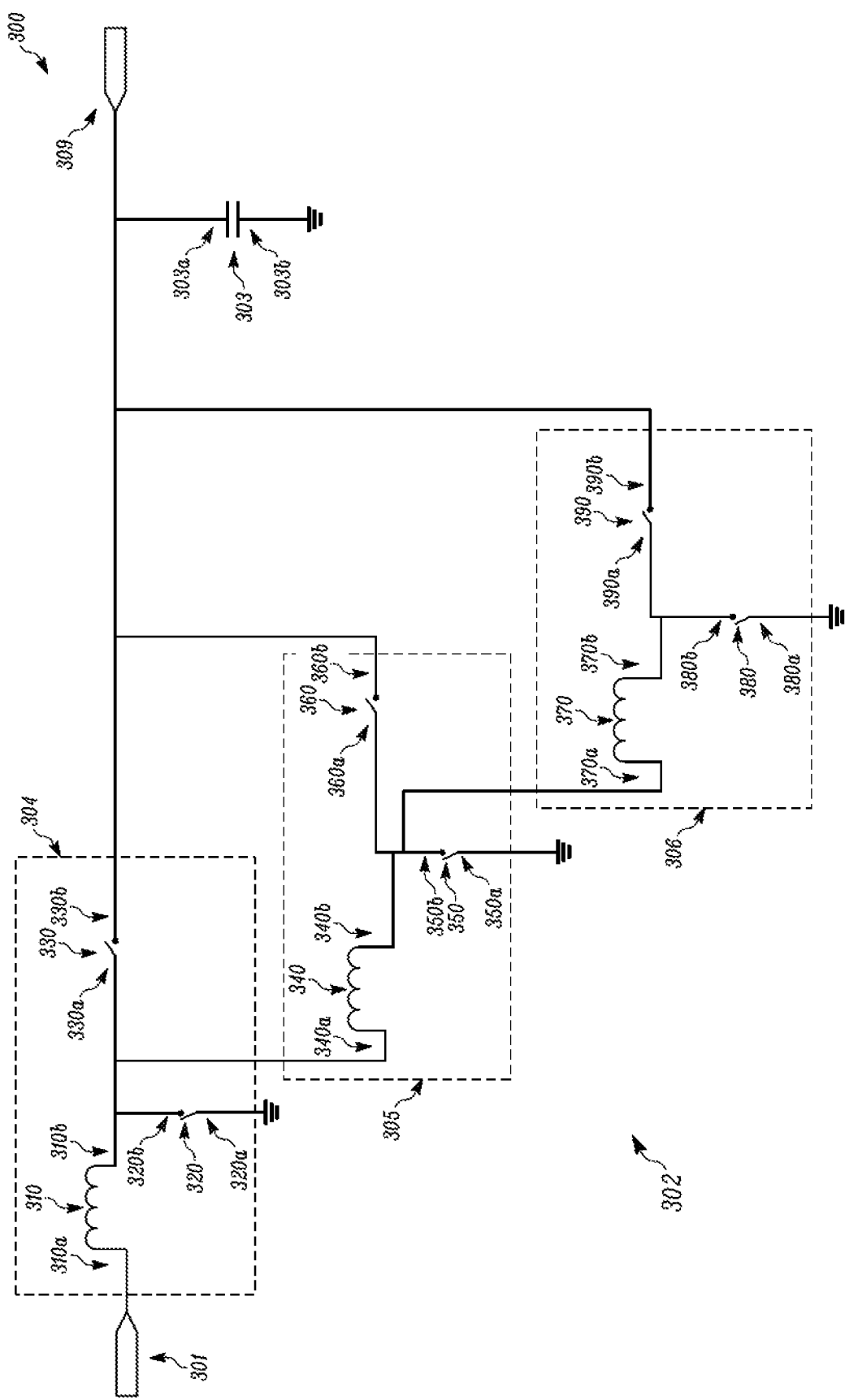
FIG. 3 is a circuit diagram of a DC to DC boost converter in a boost converter unit for an HVACR system, according to a second embodiment.

FIG. 3 is a circuit diagram of another DC to DC boost converter 302 in a boost converter unit 300 for an HVACR system, according to a second embodiment. The DC to DC boost converter unit 300 includes a DC power supply 301, a DC to DC boost converter 302, a DC link capacitor 303, and a load 309. The DC to DC boost converter 302 includes a first boost circuit 304, a second boost circuit 305, and a third boost circuit 306. The structure and function of the first boost circuit 304 and the second boost circuit 305 can be similar to the first boost circuit 204 and the second boost circuit 205 respectively in FIG. 2. The structure and function of the DC power supply 301 and the DC link capacitor 303 can be similar to the DC power supply 201 and the DC link capacitor 203 respectively in FIG. 2. The structure and function of the load 309 can be similar to the inverter circuit 104 combined with the variable speed electric machine 105 in FIG. 1A.

In FIG. 3, the third boost circuit 306 includes a third inductor 370 and a third set of switches (a fifth switch element 380 and a sixth switch element 390). The third inductor 370 includes a first end 370a and a second end 370b. The fifth switch element 380 includes a source terminal 380a and a drain terminal 380b. The sixth switch element 390 includes a source terminal 390a and a drain terminal 390b. The first end 370a of the third inductor 370 connects to the second end 340b of the second inductor 340. The second end 370b of the third inductor 370 and the drain terminal 380b of the fifth switch element 380 connect to the source terminal 390a of the sixth switch element 390. The source terminal 380a of the fifth switch element 380 connects to the second end 303b of the DC link capacitor 303. The drain terminal 390b of the sixth switch element 390 connects to the first end 303a of the DC link capacitor 303.

A controller (for example, the controller 106 shown in FIG. 1A) can control the switch elements 320, 330, 350, 360, 380, and 390 based on a plurality of parameters sensed by a plurality of sensors (not shown) sent to the controller. In operation, based on the sensed parameters, when a first boosted voltage (i.e. a low voltage), is needed corresponding to a low speed requirement of the variable speed electric machine, the controller can turn both the second set of switches (switch element 350 and switch element 360) and the third set of switches (switch element 380 and switch element 390) off. The first boost circuit 304 (including the first inductor 310, the first switch element 320, and the second switch element 330) can boost the input DC voltage to the first boosted voltage. In such scenarios, the second inductor 340 and the third inductor 370 are disconnected (i.e. not used) from the circuit. During boosting, the controller can switch the switch elements 320 and/or 330 to charge the first inductor 310 and to change the state to transfer energy from the first inductor 310 into the DC link capacitor 303.

In operation, based on the sensed parameters, when a second boosted voltage (i.e. a medium voltage) is needed corresponding to a medium speed requirement of the variable speed electric machine, the controller can turn both the first set of switches (switch element 320 and 330) and the third set of switches (switch element 380 and switch element 390) off. The first inductor 310 and the second boost circuit 305 (including the second inductor 340, the third switch element 350, and the fourth switch element 360) can boost the input DC voltage to the second boosted voltage. In such scenarios, the first inductor 310 and the second inductor 340 are connected (or used) in series. The third inductor 370 is disconnected (i.e. not used) from the circuit. During boosting, the controller can switch the switch elements 350 and/or 360 to charge the first inductor 310 and the second inductor 340 and to change the state to transfer energy from the first inductor 310 and the second inductor 340 into the DC link capacitor 303.

In operation, based on the sensed parameters, when a third boosted voltage (i.e. a high voltage) is needed corresponding to a high speed requirement of the variable speed electric machine, the controller can turn both the first set of switches (switch element 320 and 330) and the second set of switches (switch element 350 and switch element 360) off. The first inductor 310, the second inductor 340, and the third boost circuit 306 (including the third inductor 370, the fifth switch element 380, and the sixth switch element 390) can boost the input DC voltage to the third boosted voltage. In such scenarios, the first inductor 310, the second inductor 340, and the third inductor 370 are connected (or used) in series. During boosting, the controller can switch the switch elements 380 and/or 390 to charge the first inductor 310, the second inductor 340, and the third inductor 370, and to change the state to transfer energy from the first inductor 310, the second inductor 340, and the third inductor 370 into the DC link capacitor 303.

It is to be appreciated that the addition of new boost circuit(s) can go further to get a whole range of boosted voltages for a whole range of speeds/loads of the variable speed electric machine.

Figure 4:
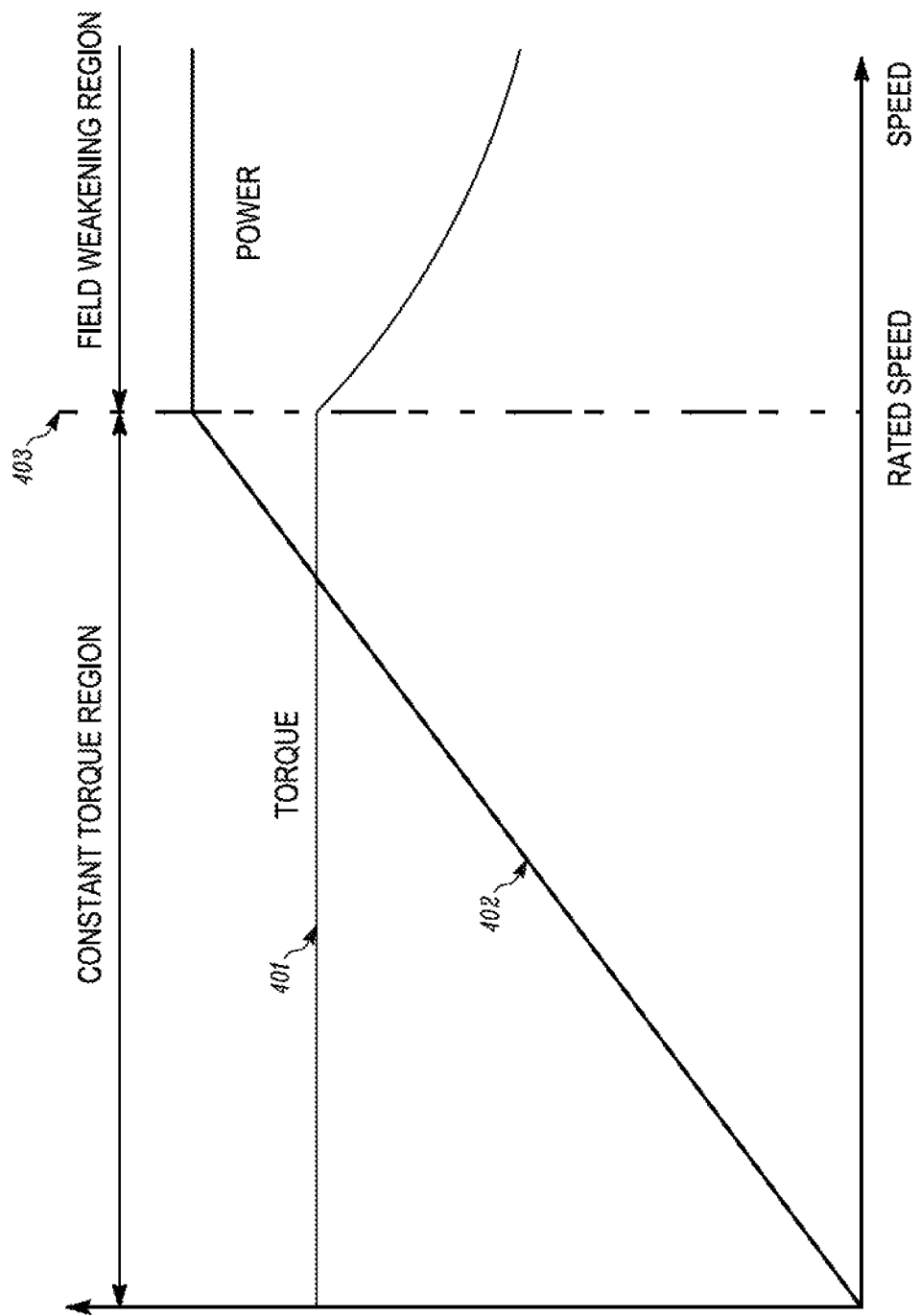
FIG. 4 illustrates a torque/power-speed relationship diagram of a variable speed electric machine, according to some embodiments.

FIG. 4 illustrates a torque/power-speed relationship diagram of a variable speed electric machine, according to some embodiments. In particular. FIG. 4 shows a first data curve 401 that illustrates the relationship between the torque and the speed of the variable speed electric machine. FIG. 4 also shows a second data curve 402 that illustrates the relationship between the power (voltage, current, and/or frequency) and the speed of the variable speed electric machine. In FIG. 4, at the rated speed (i.e. the speed at which the variable speed electric machine is designed to operate with an appropriate torque load) of the variable speed electric machine, there is a maximum torque per ampere (MTPA) point 403. Increasing the speed of the variable speed electric machine beyond the MTPA point 403, there is a field weakening region. This can lead to flux weakening, which means power would be spent to counteract the physical property of the variable speed electric machine. Before the MTPA point 403 is reached, the maximum torque remains constant (i.e. in a constant torque region) and the power needed to run the variable speed electric machine increases as the speed of the variable speed electric machine increases. It will be appreciated that current in the constant torque region can be a constant that is close to a maximum limit. Increasing the speed of the variable speed electric machine beyond the MTPA point 403 causes the maximum torque 401 to drop (i.e. in a field weakening region) while the power output by the variable speed electric machine remains constant. Different loads can have their own torque/power-speed relationship diagram and their own MTPA point.

To achieve increased efficiency (optimum operation) of the variable speed electric machine and the overall system, a controller (not shown) can be used to control a DC to DC boost converter to generate a variable boosted voltage based on the torque and/or power needed by the variable speed electric machine at the MTPA point 403 (or at the rated speed) for a particular load. In one embodiment, simulation data shows that by using a inverter-converter system as described in FIG. 1A, there can be an about 125.1141 watts reduction in input power (input to the DC to DC boost converter), an about 10.42671 ampere reduction in input current (input to the DC to DC boost converter), and an about 17.87% efficiency gain in the system. It will be appreciated that efficiency gain can be calculated by comparing input power without the invention versus a simulated efficiency considering the DC to DC boost converter losses and new losses from the inverter and the variable speed electric machine. The simulation data is based on a two-speed electric machine that generates about 240 volts at full speed/power and about 120 volts at half speed/power, an about 12 volts input DC voltage to a DC to DC boost converter, a first boosted voltage about 170 volts, and a second boosted voltage about 340 volts. The detailed description of controlling the DC to DC boost converter by the controller based on the torque and/or power requirement needed by the variable speed electric machine is discussed above with respect to FIGS. 1-3 and FIGS. 5-8 below.

Figure 5A:
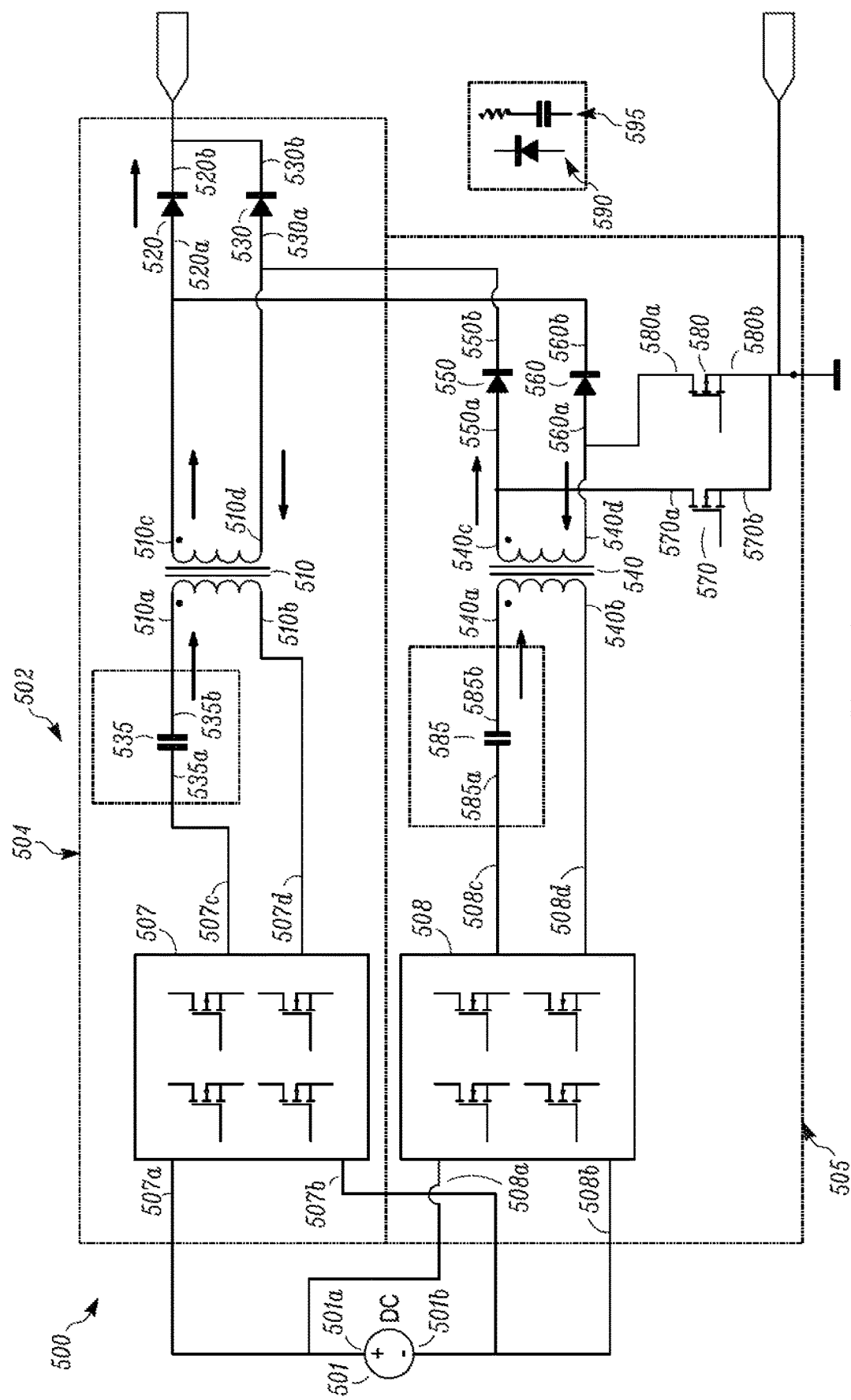
FIGS. 5A and 5B are circuit diagrams of a DC to DC boost converter in a boost converter unit for an HVACR system, according to a third embodiment.
Figure 5B:
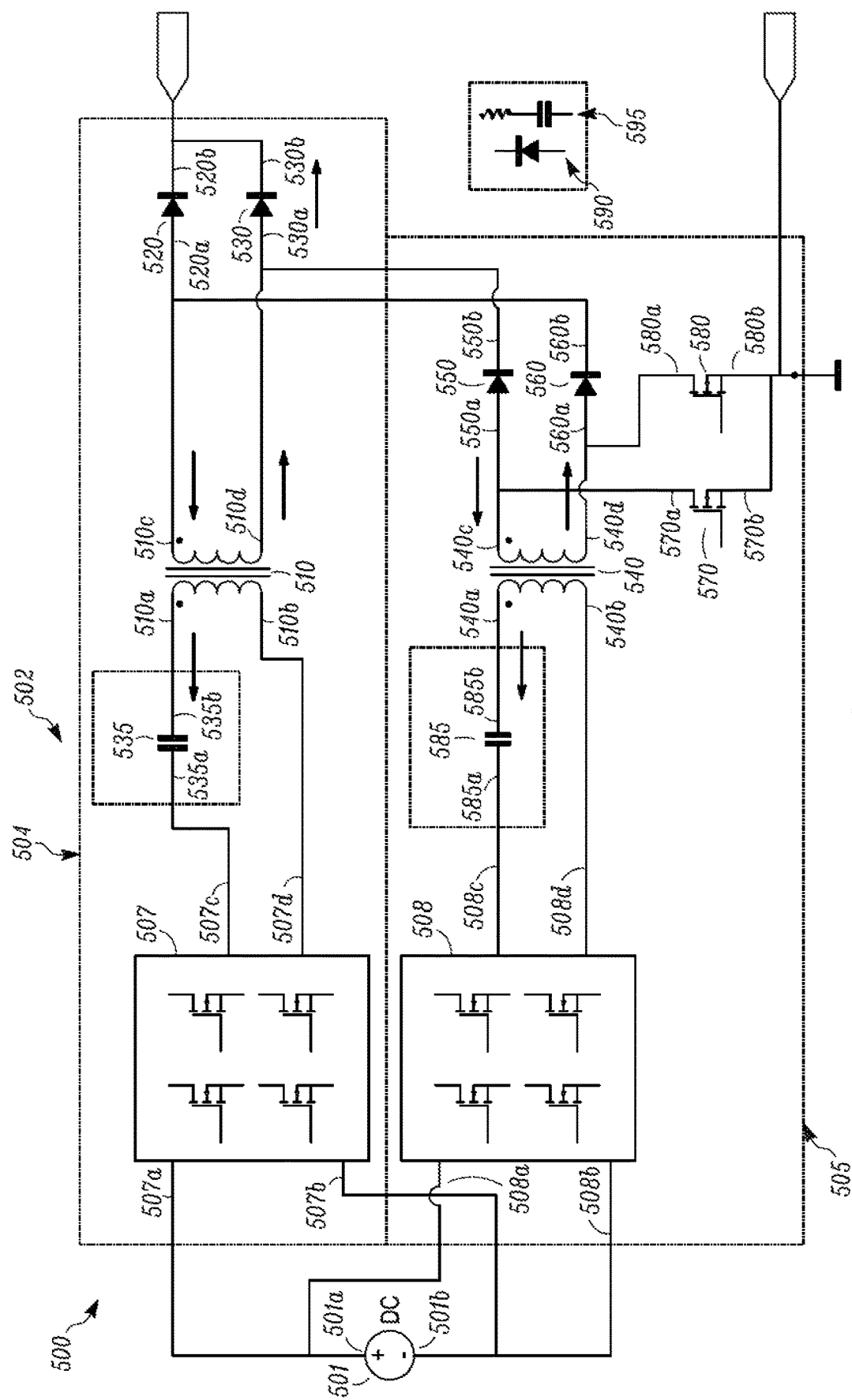

FIGS. 5A and 5B are circuit diagrams of a DC to DC boost converter 502 in a boost converter unit 500 for an HVACR system, according to a third embodiment. It will be appreciated that FIGS. 5A and 5B are identical circuit diagrams. FIG. 5A illustrates a half of the AC wave where the current is going in one direction. FIG. 5B illustrates another half of the AC wave where the current is going in a different direction. The boost converter unit 500 includes a DC power supply 501, a DC to DC boost converter 502, and a DC link capacitor (not shown). The DC to DC boost converter 502 includes a first boost circuit 504 and a second boost circuit 505. The structure and function of the DC power supply 501 can be similar to the he DC source 101 in FIG. 1A. The DC power supply 501 includes a positive electrode 501a and a negative electrode 501b. The structure and function of the DC to DC boost converter 502 can be similar to the DC to DC boost converter 102 in FIG. 1A.

Returning to FIGS. 5A and 5B, the first boost circuit 504 includes a first bridge 507, a first transformer 510, and a first set of diodes (a first diode 520 and a second diode 530). The first bridge 507 includes inputs (a first input 507a and a second input 507b) and outputs (a first output 507c and a second output 507d). The first transformer 510 includes primary windings (with a first end 510a and a second end 510b) and secondary windings (with a first end 510c and a second 510d). The first diode 520 includes an anode 520a and a cathode 520b. The second diode 530 includes an anode 530a and a cathode 530b. In some embodiments, the first boost circuit 504 can include a first DC blocking capacitor 535. The first DC blocking capacitor 535 includes a first end 535a and a second end 535b. The first DC blocking capacitor 535 can help to prevent inducing DC bias In an embodiment, DC bias means DC offset from gradual buildup of energy in the magnetic circuit because the alternating current wave may not be balanced) on the primary windings of first transformer 510. DC bias can cause, for example, thermal issues. It will be appreciated that in some embodiments the first boost circuit 504 does not include the first DC blocking capacitor 535.

The second boost circuit 505 includes a second bridge 508, a second transformer 540, a second set of diodes (a third diode 550 and a fourth diode 560), and a first set of switches (a first switch element 570 and a second switch element 580). The second bridge 508 includes inputs (a first input 508a and a second input 508b) and outputs (a first output 508c and a second output 508d). The second transformer 540 includes primary windings (with a first end 540a and a second end 540b) and secondary windings (with a first end 540c and a second end 540d). The third diode 550 includes an anode 550a and a cathode 550b. The fourth diode 560 includes an anode 560a and a cathode 560b. The first switch element 570 includes a drain terminal 570a and a source terminal 570b. The second switch element 580 includes a drain terminal 580a and a source terminal 580b. The diodes (520, 530, 550 and 560) can act as rectifiers. In an embodiment one or more of the diodes (520, 530, 550 and/or 560) can rectify the wave or ensure current goes in one direction and change alternating current into a direct current. The bridges 507 and/or 508 can help with smoothing the current. In some embodiments, the second boost circuit 505 can include a second DC blocking capacitor 585. The second DC blocking capacitor 585 includes a first end 585a and a second end 585b. The second DC blocking capacitor 585 can help to prevent inducing DC bias on the primary windings of second transformer 540. DC bias can cause, for example, thermal issues. It will be appreciated that in some embodiments the second boost circuit 505 does not include the second DC blocking capacitor 585.

In some embodiments, the first transformer 510 and the second transformer 540 may not share the same core (i.e., 510 and 540 are separate transformers). It will be appreciated that the winding turns ratio of the transformers 510 and/or 540 can depend on specific application requirements and, for example, input and output voltages, output current and ripple, switching frequency, etc. Also, in some embodiments, the first transformer 510 and the second transformer 540 can be electromagnetic coils and/or tapped winding magnetics.

In some embodiments, the switch elements 570 and 580 can be one or more of a Metal-Oxide-Semiconductor Field-Effect Transistor (MOSFET). Insulated Gate Bipolar Transistor (IGBT), Bipolar Junction Transistor (BJT) or the like. In some embodiments, the switch elements 570 and 580 can be regular switches. In such embodiments, the second boost circuit 505 can include a diode 590 and/or a resistor-capacitor (RC) snubber 595. The RC snubber 595 can help to suppress, for example, voltage transients in the boost converter unit 500. The diode 590 and/or the RC snubber 595 can be connected in the second boost circuit 505 in parallel with the first switch element 570 and/or the second switch element 580. It will be appreciated that if switch elements 570 and 580 are, for example, MOSFET switches, the diode 590 and/or the RC snubber 595 may not be required because the diode 590 and/or the RC snubber 595 can be emulated by the MOSFET switches. In such embodiments, there can be fewer components and less loss in the second boost circuit 505.

In FIGS. 5A and 5B, the positive electrode 501a and the negative electrode 501b of the DC power supply 501 connect to the first input 507a and the second input 507b of the first bridge 507, respectively. The first output 507c of the first bridge 507 connects to the first end 535a of the first DC blocking capacitor 535. The second end 535b of the first DC blocking capacitor 535 connects to the first end 510a of the primary windings of the first transformer 510. In some embodiments, the first output 507c directly connects to the first end 510a of the primary windings of the first transformer 510. The second end 510b of the primary windings of the first transformer 510 connects to the second output 507d of the first bridge 507. The first end 510c of the secondary windings of the first transformer 510 connects to the anode 520a of the first diode 520. The second end 510d of the secondary windings of the first transformer 510 connects to the anode 530a of the second diode 530. The cathode 520b of the first diode 520 connects to the cathode 530b of the second diode 530 as a first output of the DC to DC boost converter 502.

The positive electrode 501a and the negative electrode 501b connect to the first input 508a and the second input 508b of the second bridge 508, respectively. The first output 508c of the second bridge 508 connects to the first end 585a of the second DC blocking capacitor 585. The second end 585b of the second DC blocking capacitor 585 connects to the first end 540a of the primary windings of the second transformer 540. In some embodiments, the first output 508c directly connects to the first end 540a of the primary windings of the second transformer 540. The second end 540b of the primary windings of the second transformer 540 connects to the second output 508d of the second bridge 508. The first end 540c of the secondary windings of the second transformer 540 connects to the anode 550a of the third diode 550. The second end 540*d* of the secondary windings of the second transformer 540 connects to the anode 560*a* of the fourth diode 560. The cathode 550*b* of the third diode 550 connects to the second end 510*d* of the secondary windings of the first transformer 510 and the anode 530*a* of the second diode 530. The cathode 560*b* of the fourth diode 560 connects to the first end 510*c* of the secondary windings of the first transformer 510 and the anode 520*a* of the first diode 520. The drain terminal 570*a* of the first switch element 570 connects to the first end 540*c* of the secondary windings of the second transformer 540 and the anode 550*a* of the third diode 550. The drain terminal 580*a* of the second switch element 580 connects to the second end 540*d* of the secondary windings of the second transformer 540 and the anode 560*a* of the fourth diode 560. The source terminal 570*b* of the first switch element 570 and the source terminal 580*b* of the second switch element 580 connect to the ground (or the reference) as a second output of the DC to DC boost converter 502. It will be appreciated that the first and the second output of the DC to DC boost converter 502 can be bidirectional and can connect to an inverter (e.g., the inverter circuit 104 shown in FIG. 1A).

In some embodiments, the anode of the diode 590 can connect to the source terminal 570*b* of the first switch element 570 and the cathode of the diode 590 can connect to the drain terminal 570*a* of the first switch element 570. In some embodiments, the capacitor side end of the RC snubber 595 can connect to the source terminal 570*b* of the first switch element 570 and the resistor side end of the RC snubber 595 can connect to the drain terminal 570*a* of the first switch element 570. In some embodiments, the anode of the diode 590 can connect to the source terminal 580*b* of the second switch element 580 and the cathode of the diode 590 can connect to the drain terminal 580*a* of the second switch element 580. In some embodiments, the capacitor side end of the RC snubber 595 can connect to the source terminal 580*b* of the second switch element 580 and the resistor side end of the RC snubber 595 can connect to the drain terminal 580*a* of the second switch element 580.

A controller (e.g., the controller 106 shown in FIG. 1A) can control the switch elements 570 and 580 based on a plurality of parameters sensed by a plurality of sensors (not shown) and sent to the controller. In operation, the first bridge 507 is configured to drive the primary windings of the first transformer 510. The second bridge 508 is configured to drive the primary windings of the second transformer 540.

Based on the sensed parameters, when a first boosted voltage, a medium (or low) voltage, for example, 150 volts or 170 volts, is needed corresponding to a medium (or low) speed requirement of the variable speed electric machine, the controller can turn both the switch elements 570 and 580 on (during the time when the first boosted voltage is needed). The first boost circuit 504 (including the first bridge 507, the first transformer 510, the first diode 520, the second diode 530, and/or the first DC blocking capacitor 535) can boost the input DC voltage (for example, 12 volts) to the first boosted voltage (for example, 150 volts or 170 volts). The transformation ratio (i.e., the winding turns ratio) of the first transformer 510 is designed to boost the voltage. In such scenarios, the secondary windings of the second transformer 540 are shorted out from the circuit (i.e. not used).

In operation, based on the sensed parameters, when a second boosted voltage, a high voltage, for example, 300 volts or 340 volts, is needed corresponding to a high speed requirement of the variable speed electric machine, the controller can control the switch elements 570 and 580 so that the first boost circuit 504 and the second boost circuit 505 (including the second bridge 508, the second transformer 540, the third diode 550, the fourth diode 560, the first switch element 570, the second switch element 580, and/or the second DC blocking capacitor 585) can boost the input DC voltage (for example, 12 volts) to the second boosted voltage (for example, 300 volts or 340 volts). In such scenarios, the secondary windings of the first transformer 510 and the secondary windings of the second transformer 540 are connected (or used) in series. FIG. 5A illustrates a half of the AC wave where the current is going in one direction. FIG. 5B illustrates another half of the AC wave where the current is going in a different direction. In FIG. 5A, during boosting, the controller can control or command the switch elements 570 and 580 so that the switch element 570 is off (not used, disabled, open, disconnected) and the switch element 580 is on (enabled, closed connected). The arrows illustrate the flow of the current. Diodes 530 and 560 are blocked (not used, disconnected). In FIG. 5B, during boosting, the controller can control or command the switch elements 570 and 580 so that the switch element 580 is off (not used, disabled, open, disconnected) and the switch element 570 is on (enabled, closed, connected). The arrows illustrate the flow of the current. Diodes 520 and 550 are blocked (not used, disconnected).

Figure 6:
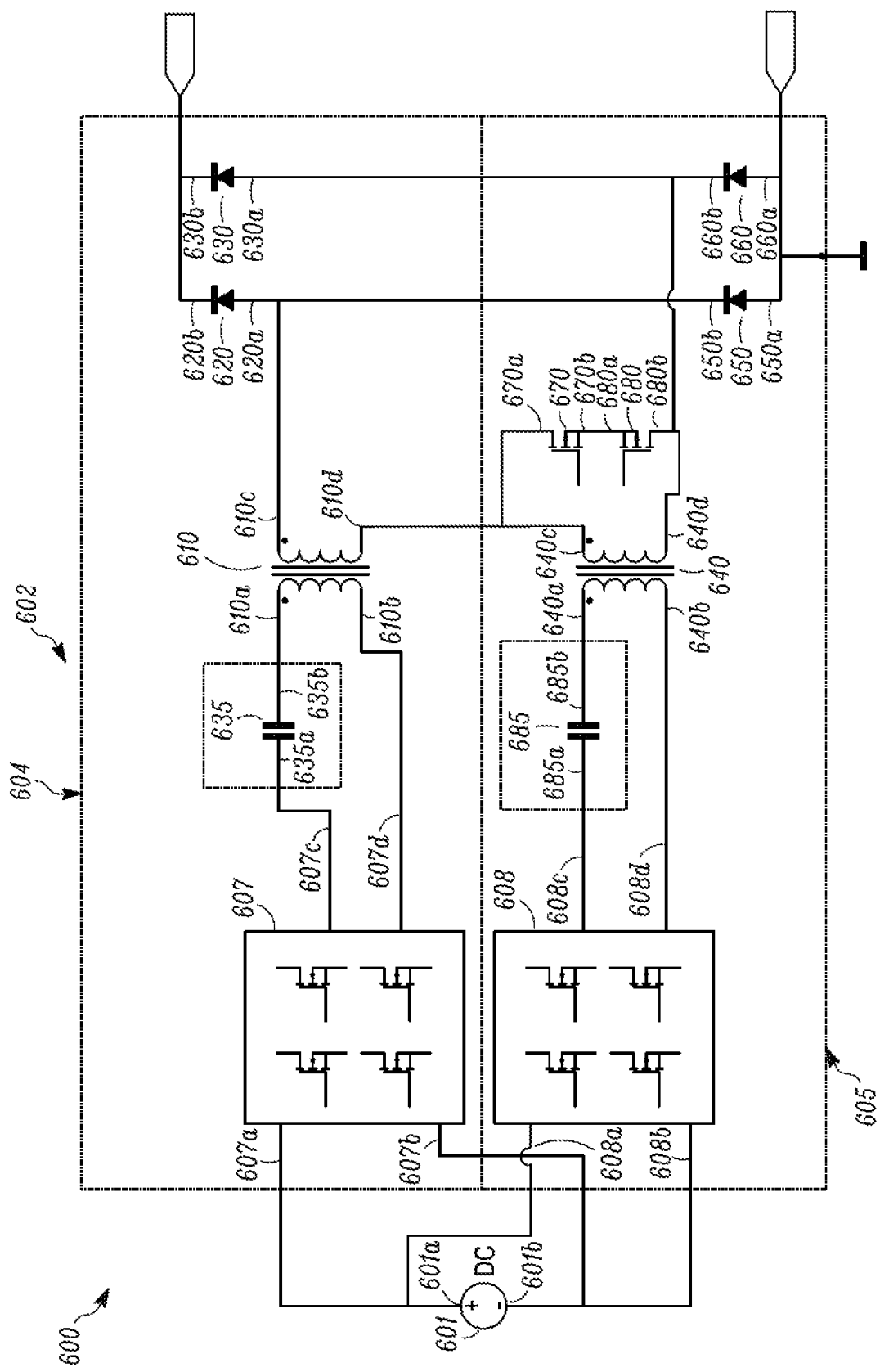
FIG. 6 is a circuit diagram of a DC to DC boost converter in a boost converter unit for an HVACR system, according to a fourth embodiment.

FIG. 6 is a circuit diagram of a DC to DC boost converter 602 in a boost converter unit 600 for an HVACR system, according to a fourth embodiment. The boost converter unit 600 includes a DC power supply 601, a DC to DC boost converter 602, and a DC link capacitor (not shown). The DC to DC boost converter 602 includes a first boost circuit 604 and a second boost circuit 605. The structure and function of the DC power supply 601 can be similar to the DC source 101 shown in FIG. 1A. The DC power supply 601 includes a positive electrode 601*a* and a negative electrode 601*b*. The structure and function of the DC to DC boost converter 602 can be similar to the DC to DC boost converter 102 in FIG. 1A.

Returning to FIG. 6, the first boost circuit 604 includes a first bridge 607, a first transformer 610, and a first set of diodes (a first diode 620 and a second diode 630). The first bridge 607 includes inputs (a first input 607*a* and a second input 607*b*) and outputs (a first output 607*c* and a second output 607*d*). The first transformer 610 includes primary windings (with a first end 610*a* and a second end 610*b*) and secondary windings (with a first end 610*c* and a second 610*d*). The first diode 620 includes an anode 620*a* and a cathode 620*b*. The second diode 630 includes an anode 630*a* and a cathode 630*b*. In some embodiments, the first boost circuit 604 can include a first DC blocking capacitor 635. The first DC blocking capacitor 635 includes a first end 635*a* and a second end 635*b*. The first DC blocking capacitor 635 can help to prevent inducing DC bias on the primary windings of first transformer 610. DC bias can cause, for example, thermal issues. It will be appreciated that in some embodiments, the first boost circuit 604 may not include the first DC blocking capacitor 635.

The second boost circuit 605 includes a second bridge 608, a second transformer 640, a second set of diodes (a third diode 650 and a fourth diode 660), and a first set of switches (a first switch element 670 and a second switch element 680). The second bridge 608 includes inputs (a first input 608*a* and a second input 608*b*) and outputs (a first output 608*c* and a second output 608*d*). The second transformer 640 includes primary windings (with a first end 640*a* and a second end 640*b*) and secondary windings (with a first end 640*c* and a second end 640*d*). The third diode 650 includes an anode 650*a* and a cathode 650*b*. The fourth diode 660 includes an anode 660a and a cathode 660b. The first switch element 670 includes a drain terminal 670a and a source terminal 670b. The second switch element 680 includes a source terminal 680a and a drain terminal 680b. The diodes (620, 630, 650 and 660) can act as rectifiers. The bridges 607 and/or 608 can help with smoothing the current. In some embodiments, the second boost circuit 605 can include a second DC blocking capacitor 685. The second DC blocking capacitor 685 includes a first end 685a and a second end 685b. The second DC blocking capacitor 685 can help to prevent inducing DC bias on the primary windings of second transformer 640. DC bias can cause, for example, thermal issues. It will be appreciated that in some embodiments the second boost circuit 605 does not include the second DC blocking capacitor 685.

In some embodiments, the first transformer 610 and the second transformer 640 may not share the same core (i.e., 610 and 640 are separate transformers). It will be appreciated that the winding turns ratio of the transformers 610 and/or 640 can depend on specific application requirements and, for example, input and output voltages, output current and ripple, switching frequency, etc. In some embodiments, the first transformer 610 and the second transformer 640 can be electromagnetic coils and/or tapped winding magnetics. In some embodiments, the switch elements 670 and 680 can be one or more of a Metal-Oxide-Semiconductor Field-Effect Transistor (MOSFET). Insulated Gate Bipolar Transistor (IGBT), Bipolar Junction Transistor (BJT) or the like.

In FIG. 6, the positive electrode 601a and the negative electrode 601b of the DC power supply 601 connect to the first input 607a and the second input 607b of the first bridge 607, respectively. The first output 607c of the first bridge 607 connects to the first end 635a of the first DC blocking capacitor 635. The second end 635b of the first DC blocking capacitor 635 connects to the first end 610a of the primary windings of the first transformer 610. In some embodiments, the first output 607c directly connects to the first end 610a of the primary windings of the first transformer 610. The second end 610b of the primary windings of the first transformer 610 connects to the second output 607d of the first bridge 607. The first end 610c of the secondary windings of the first transformer 610 connects to the anode 620a of the first diode 620. The second end 610d of the secondary windings of the first transformer 610 connects to the first end 640c of the secondary windings of the second transformer 640. The cathode 620b of the first diode 620 connects to the cathode 630b of the second diode 630 as a first output of the DC to DC boost converter 602.

The positive electrode 601a and the negative electrode 601b connect to the first input 608a and the second input 608b of the second bridge 608, respectively. The first output 608c of the second bridge 608 connects to the first end 685a of the second DC blocking capacitor 685. The second end 685b of the second DC blocking capacitor 685 connects to the first end 640a of the primary windings of the second transformer 640. In some embodiments, the first output 608c directly connects to the first end 640a of the primary windings of the second transformer 640. The second end 640b of the primary windings of the second transformer 640 connects to the second output 608d of the second bridge 608. The first end 640c of the secondary windings of the second transformer 640 and the second end 610d of the secondary windings of the first transformer 610 connect to the drain terminal 670a of the first switch element 670. The source terminal 670b of the first switch element 670 connects to the source terminal 680a of the second switch element 680. The second end 640d of the secondary windings of the second transformer 640 and the drain terminal 680b of the second switch element 680 connect to the cathode 660b of the fourth diode 660. The cathode 650b of the third diode 650 connects to the first end 610c of the secondary windings of the first transformer 610 and the anode 620a of the first diode 620. The cathode 660b of the fourth diode 660 connects to the anode 630a of the second diode 630, the second end 640d of the secondary windings of the second transformer 640, and the drain terminal 680b of the second switch element 680. The anode 650a of the third diode 650 and the anode 660a of the fourth diode 660 connect to the ground (or the reference) as a second output of the DC to DC boost converter 602. It will be appreciated that the first and the second output of the DC to DC boost converter 602 can be bidirectional and can connect to an inverter (e.g., the inverter circuit 104 shown in FIG. 1A).

A controller (e.g., the controller 106 shown in FIG. 1A) can control the switch elements 670 and 680 based on a plurality of parameters sensed by a plurality of sensors (not shown) and sent to the controller. In operation, the first bridge 607 is configured to drive the primary windings of the first transformer 610. The second bridge 608 is configured to drive the primary windings of the second transformer 640. Based on the sensed parameters, when a first boosted voltage, a medium (or low) voltage, for example, 150 volts or 170 volts, is needed corresponding to a medium (or low) speed requirement of the variable speed electric machine, the controller can turn both the switch elements 670 and 680 on (during the time when the first boosted voltage is needed). It will be appreciated that when the switch elements 670 and 680 are, for example, MOSFET switches, when the first boosted voltage is needed, the controller can control or command the switch elements 670 and/or 680 so that one switch element is on and the body diode of the other switch element is used to conduct current. The first boost circuit 604 can boost the input DC voltage (for example, 12 volts) to the first boosted voltage (for example, 150 volts or 170 volts). The transformation ratio (i.e., the winding turns ratio) of the first transformer 610 is designed to boost the voltage. In such scenarios, the secondary windings of the second transformer 640 are shorted out from the circuit (i.e. not used).

In operation, based on the sensed parameters, when a second boosted voltage, a high voltage, for example, 300 volts or 340 volts, is needed corresponding to a high speed requirement of the variable speed electric machine, the controller can control the switch elements 670 and 680 so that the first boost circuit 604 and the second boost circuit 605 can boost the input DC voltage (for example, 12 volts) to the second boosted voltage (for example, 300 volts or 340 volts). In such scenarios, the secondary windings of the first transformer 610 and the secondary windings of the second transformer 640 are connected (or used) in series. During boosting, the controller can control or command the switch elements 670 and/or 680 so that both the switch element 670 and the switch element 680 are off.

Compared with using one boost circuit for high voltage and another boost circuit for low voltage, the design shown in FIGS. 5A, 5B, and 6 can save parts (for example, transformer) since the cost and/or weight of transformers can be high. When the first boosted voltage is needed, by controlling the switch elements (570 and 580, or 670 and 680) to both on, the second boost stage (including the secondary windings of the second transformer) can be completely shorted out. It will be appreciated that the third and the fourth embodiments can gain efficiency by completely turning off the second boost stage (including bypassing the primary windings of the second boost stage). Thus, loss in the primary windings of the transformer(s) can be eliminated (i.e., no loss in the transformer(s)). The transformers can be designed for an optimal transformation ratio (i.e., the winding turns ratio). There can be no loss for the switch elements (570 and 580, or 670 and 680). One advantage of using transformer(s) is that the secondary circuit can be isolated from the primary circuit.

It will be appreciate that the embodiments shown in FIGS. 5A, 5B, and 6 can be extended to nth degree. For example, the DC to DC boost converter can include a third boost circuit. Similar to the second boost circuit 505 or 605, the third boost circuit can include a third bridge, a third transformer, a fifth diode, a sixth diode, a third switch element, and a fourth switch element. In some embodiments, the third boost circuit can also include a third DC blocking capacitor. In some embodiments, the third boost circuit can further include a diode and/or a RC snubber. It will be appreciated that the addition of new boost circuit(s) can go further to get a whole range of boosted voltages for a whole range of speeds/loads of the variable speed electric machine.

Figure 7A:
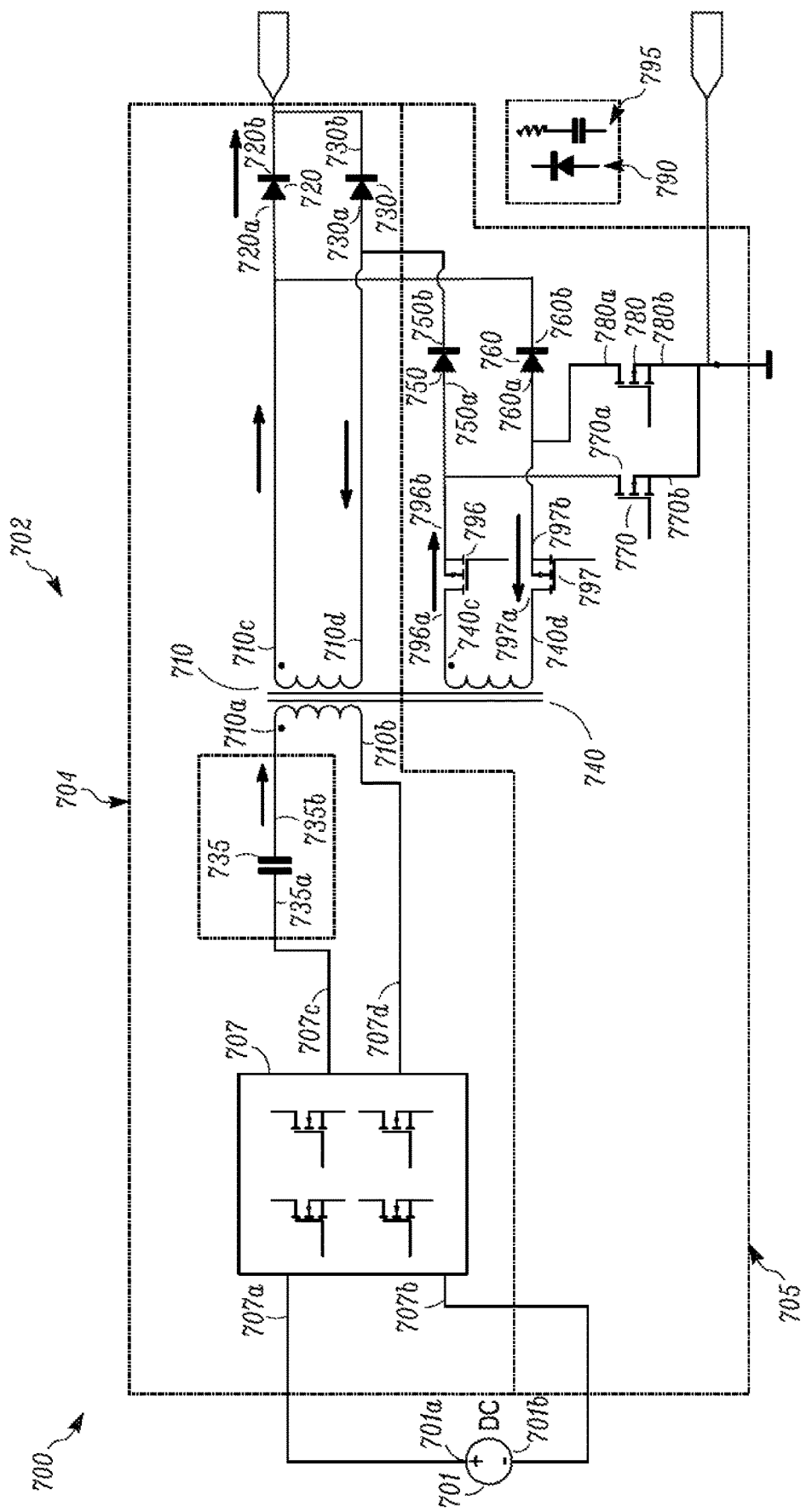
FIGS. 7A and 7B are circuit diagrams of a DC to DC boost converter in a boost converter unit for an HVACR system, according to a fifth embodiment.
Figure 7B:
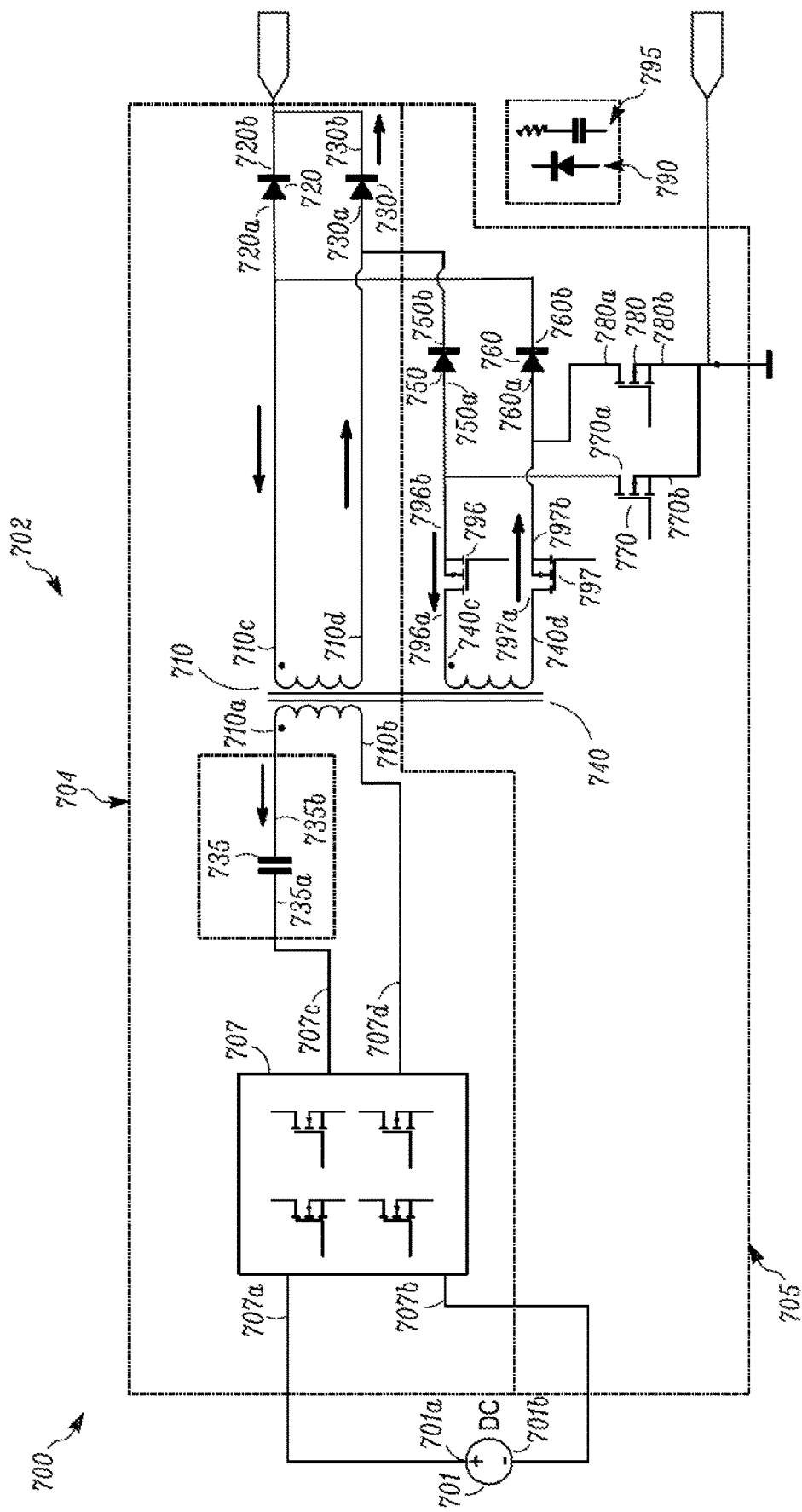

FIGS. 7A and 7B are circuit diagrams of a DC to DC boost converter 702 in a boost converter unit 700 for an HVACR system, according to a fifth embodiment. It will be appreciated that FIGS. 7A and 7B are identical circuit diagrams. FIG. 7A illustrates a half of the AC wave where the current is going in one direction. FIG. 7B illustrates another half of the AC wave where the current is going in a different direction. The boost converter unit 700 includes a DC power supply 701, a DC to DC boost converter 702, and a DC link capacitor (not shown). The DC to DC boost converter 702 includes a first boost circuit 704 and a second boost circuit 705. The structure and function of the DC power supply 701 can be similar to the he DC source 101 in FIG. 1A. The DC power supply 701 includes a positive electrode 701a and a negative electrode 701b. The structure and function of the DC to DC boost converter 702 can be similar to the DC to DC boost converter 102 in FIG. 1A.

Returning to FIGS. 7A and 7B, the first boost circuit 704 includes a bridge 707, a first transformer 710, and a first set of diodes (a first diode 720 and a second diode 730). The bridge 707 includes inputs (a first input 707a and a second input 707b) and outputs (a first output 707c and a second output 707d). The first transformer 710 includes primary windings (with a first end 710a and a second end 710b) and secondary windings (with a first end 710c and a second 710d). The first diode 720 includes an anode 720a and a cathode 720b. The second diode 730 includes an anode 730a and a cathode 730b. The bridge 707 can help with smoothing the current. In some embodiments, the first boost circuit 704 can include a DC blocking capacitor 735. The DC blocking capacitor 735 includes a first end 735a and a second end 735b. The DC blocking capacitor 735 can help to prevent inducing DC bias on the primary windings of first transformer 710. DC bias can cause, for example, thermal issues. It will be appreciated that in some embodiments the first boost circuit 704 does not include the DC blocking capacitor 735. The second boost circuit 705 includes a second transformer 740, a second set of diodes (a third diode 750 and a fourth diode 760), a first set of switches (a first switch element 770 and a second switch element 780), and a set of auxiliary switches (a first auxiliary switch element 796 and a second auxiliary switch element 797). The second transformer 740 shares primary windings and core with the first transformer 710 and includes secondary windings (with a first end 740c and a second end 740d). The third diode 750 includes an anode 750a and a cathode 750b. The fourth diode 760 includes an anode 760a and a cathode 760b. The first switch element 770 includes a drain terminal 770a and a source terminal 770b. The second switch element 780 includes a drain terminal 780a and a source terminal 780b. The first auxiliary switch element 796 includes a drain terminal 796a and a source terminal 796b. The second auxiliary switch element 797 includes a drain terminal 797a and a source terminal 797b. The first transformer 710 and the second transformer 740 may share a same core and same primary windings (i.e., 710 and 740 can be a single transformer that has two outputs). One or more of the diodes (720, 730, 750 and 760) can act as rectifiers, for example similar to diodes 520, 530, 550, and 560 above.

It will be appreciated that the winding turns ratio of the transformers 710 and/or 740 can depend on specific application requirements and, for example, input and output voltages, output current and ripple, switching frequency, etc. In some embodiments, the first transformer 710 and the second transformer 740 can be electromagnetic coils and/or tapped winding magnetics. In some embodiments, the switch elements (770 and 780) and/or auxiliary switch elements (796 and 797) can be one or more of a Metal-Oxide-Semiconductor Field-Effect Transistor (MOSFET), Insulated Gate Bipolar Transistor (IGBT), Bipolar Junction Transistor (BJT) or the like. In some embodiments, the switch elements 770 and 780 can be regular switches. In such embodiments, the second boost circuit 705 can include a diode 790 and/or a RC snubber 795. The RC snubber 795 can help to suppress, for example, voltage transients in the boost converter unit 700. The diode 790 and/or the RC snubber 795 can be connected in the second boost circuit 705 in parallel with the first switch element 770 and/or the second switch element 780. It will be appreciated that if switch elements 770 and 780 are, for example, MOSFET switches, the diode 790 and/or the RC snubber 795 may not be required because the diode 790 and/or the RC snubber 795 can be emulated by the MOSFET switches. In such embodiments, there can be fewer components and less loss in the second boost circuit 705.

In FIGS. 7A and 7B, the positive electrode 701a and the negative electrode 701b of the DC power supply 701 connect to the first input 707a and the second input 707b of the bridge 707, respectively. The first output 707c of the bridge 707 connects to the first end 735a of the DC blocking capacitor 735. The second end 735b of the DC blocking capacitor 735 connects to the first end 710a of the primary windings of the first transformer 710. In some embodiments, the first output 707c directly connects to the first end 710a of the primary windings of the first transformer 710. The second end 710b of the primary windings of the first transformer 710 connects to the second output 707d of the bridge 707. The first end 710c of the secondary windings of the first transformer 710 connects to the anode 720a of the first diode 720. The second end 710d of the secondary windings of the first transformer 710 connects to the anode 730a of the second diode 730. The cathode 720b of the first diode 720 connects to the cathode 730b of the second diode 730 as a first output of the DC to DC boost converter 702.

The first end 740c of the secondary windings of the second transformer 740 connects to the drain terminal 796a of the first auxiliary switch element 796. The source terminal 796b of the first auxiliary switch element 796 connects to the anode 750a of the third diode 750. The second end 740d of the secondary windings of the second transformer 740 connects to the drain terminal 797a of the second auxiliary switch element 797. The source terminal 797b of the second auxiliary switch element 797 connects to the anode 760a of the fourth diode 760. The cathode 750b of the third diode 750 connects to the second end 710d of the secondary windings of the first transformer 710 and the anode 730a of the second diode 730. The cathode 760b of the fourth diode 760 connects to the first end 710c of the secondary windings of the first transformer 710 and the anode 720a of the first diode 720. The drain terminal 770a of the first switch element 770 connects to the source terminal 796b of the first auxiliary switch element 796 and the anode 750a of the third diode 750. The drain terminal 780a of the second switch element 780 connects to the source terminal 797b of the second auxiliary switch element 797 and the anode 760a of the fourth diode 760. The source terminal 770b of the first switch element 770 and the source terminal 780b of the second switch element 780 connect to the ground (or the reference) as a second output of the DC to DC boost converter 702. It will be appreciated that the first and the second output of the DC to DC boost converter 702 can be bidirectional and can connect to an inverter (e.g., the inverter circuit 104 shown in FIG. 1A).

In some embodiments, the anode of the diode 790 can connect to the source terminal 770b of the first switch element 770 and the cathode of the diode 790 can connect to the drain terminal 770a of the first switch element 770. In some embodiments, the capacitor side end of the RC snubber 795 can connect to the source terminal 770b of the first switch element 770 and the resistor side end of the RC snubber 795 can connect to the drain terminal 770a of the first switch element 770. In some embodiments, the anode of the diode 790 can connect to the source terminal 780b of the second switch element 780 and the cathode of the diode 790 can connect to the drain terminal 780a of the second switch element 780. In some embodiments, the capacitor side end of the RC snubber 795 can connect to the source terminal 780b of the second switch element 780 and the resistor side end of the RC snubber 795 can connect to the drain terminal 780a of the second switch element 780.

A controller (for example, the controller 106 shown in FIG. 1A) can control the switch elements (770 and 780) and the auxiliary switches (796 and 797) based on a plurality of parameters sensed by a plurality of sensors (not shown) and sent to the controller. In operation, the bridge 707 is configured to drive the primary windings of the first transformer 710. Based on the sensed parameters, when a first boosted voltage, a medium (or low) voltage, for example, 150 volts or 170 volts, is needed corresponding to a medium (or low) speed requirement of the variable speed electric machine, the controller can turn both the switch elements 770 and 780 on and turn both the auxiliary switches 796 and 791 off (during the time when the first boosted voltage is needed). The first boost circuit 704 (including the first bridge 707, the first transformer 710, the first diode 720, the second diode 730, and/or the DC blocking capacitor 735) can boost the input DC voltage (for example, 12 volts) to the first boosted voltage (for example, 150 volts or 170 volts). The transformation ratio (i.e., the winding turns ratio) of the first transformer 710 is designed to boost the voltage. In such scenarios, the secondary windings of the second transformer 740 are shorted out from the circuit (i.e. not used).

In operation, based on the sensed parameters, when a second boosted voltage, a high voltage, for example, 300 volts or 340 volts, is needed corresponding to a high speed requirement of the variable speed electric machine, the controller can control the switch elements (770 and 780) and the auxiliary switches (796 and 797) so that the first boost circuit 704 and the second boost circuit 705 (including the secondary windings of the second transformer 740, the third diode 750, the fourth diode 760, the first switch element 770, the second switch element 780, the first auxiliary switch element 796, and the second auxiliary switch element 797) can boost the input DC voltage (for example, 12 volts) to the second boosted voltage (for example, 300 volts or 340 volts). In such scenarios, the secondary windings of the first transformer 710 and the secondary windings of the second transformer 740 are connected (or used) in series. FIG. 7A illustrates a half of the AC wave where the current is going in one direction. FIG. 7B illustrates another half of the AC wave where the current is going in a different direction. In FIG. 7A, during boosting, the controller can control or command the switch elements (770 and 780) and the auxiliary switches (796 and 797) so that both the auxiliary switches 796 and 797 are on, the switch element 770 is off (not used, disabled, open, disconnected), and the switch element 780 is on (enabled, closed, connected). The arrows illustrate the flow of the current. Diodes 730 and 760 are blocked (not used, disconnected). In FIG. 7B, during boosting, the controller can control or command the switch elements (770 and 780) and the auxiliary switches (796 and 797) so that both the auxiliary switches 796 and 797 are on, the switch element 780 is off (not used, disabled, open, disconnected), and the switch element 770 is on (enabled, closed, connected). The arrows illustrate the flow of the current. Diodes 720 and 750 are blocked (not used, disconnected).

Figure 8:
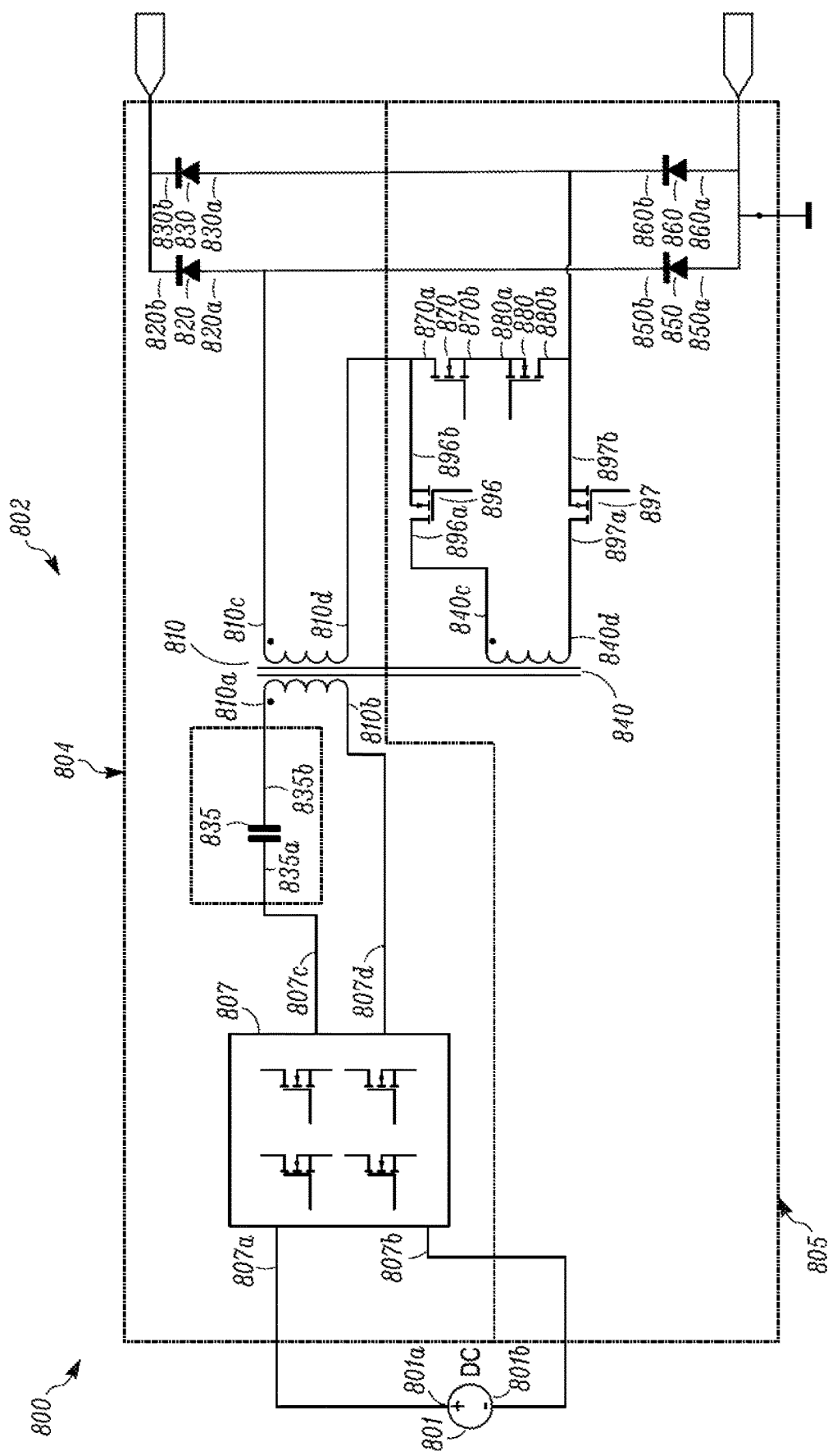
FIG. 8 is a circuit diagram of a DC to DC boost converter in a boost converter unit for an HVACR system, according to a sixth embodiment.

FIG. 8 is a circuit diagram of a DC to DC boost converter 802 in a boost converter unit 800 for an HVACR system, according to a sixth embodiment. The boost converter unit 800 includes a DC power supply 801, a DC to DC boost converter 802, and a DC link capacitor (not shown). The DC to DC boost converter 802 includes a first boost circuit 804 and a second boost circuit 805. The structure and function of the DC power supply 801 can be similar to the he DC source 101 in FIG. 1A. The DC power supply 801 includes a positive electrode 801a and a negative electrode 801b. The structure and function of the DC to DC boost converter 802 can be similar to the DC to DC boost converter 102 in FIG. 1A.

Returning to FIG. 8, the first boost circuit 804 includes a bridge 807, a first transformer 810, and a first set of diodes (a first diode 820 and a second diode 830). The bridge 807 includes inputs (a first input 807a and a second input 807b) and outputs (a first output 807c and a second output 807d). The first transformer 810 includes primary windings with a first end 810a and a second end 810b) and secondary windings (with a first end 810c and a second 810d). The first diode 820 includes an anode 820a and a cathode 820b. The second diode 830 includes an anode 830a and a cathode 830b. The bridge 807 can help with smoothing the current. In some embodiments, the first boost circuit 804 can include a DC blocking capacitor 835. The DC blocking capacitor 835 includes a first end 835a and a second end 835b. The DC blocking capacitor 835 can help to prevent inducing DC bias on the primary windings of first transformer 810. DC bias can cause, for example, thermal issues. It will be appreciated that in some embodiments the first boost circuit 804 does not include the DC blocking capacitor 835. The second boost circuit 805 includes a second transformer 840, a second set of diodes (a third diode 850 and a fourth diode 860), a first set of switches (a first switch element 870 and a second switch element 880), and a set of auxiliary switches (a first auxiliary switch element 896 and a second auxiliary switch element 897). The second transformer 840 may share primary windings and core with the first transformer 810 and includes secondary windings (with a first end 840c and a second end 840d). The third diode 850 includes an anode 850*a* and a cathode 850*b*. The fourth diode 860 includes an anode 860*a* and a cathode 860*b*. The first switch element 870 includes a drain terminal 870*a* and a source terminal 870*b*. The second switch element 880 includes a source terminal 880*a* and a drain terminal 880*b*. The first auxiliary switch element 896 includes a drain terminal 896*a* and a source terminal 896*b*. The second auxiliary switch element 897 includes a drain terminal 897*a* and a source terminal 897*b*. The first transformer 810 and the second transformer 840 may share a same core and same primary windings (i.e., 810 and 840 can be a single transformer that has two outputs). The diodes (820, 830, 850 and 860) can act as rectifiers.

It will be appreciated that the winding turns ratio of the transformers 810 and/or 840 can depend on specific application requirements and, for example, input and output voltages, output current and ripple, switching frequency, etc. In some embodiments, the first transformer 810 and the second transformer 840 can be electromagnetic coils and/or tapped winding magnetics. In some embodiments, the switch elements 870 and 880 and/or auxiliary switch elements (896 and 897) can be one or more of a Metal-Oxide-Semiconductor Field-Effect Transistor (MOSFET), Insulated Gate Bipolar Transistor (IGBT), Bipolar Junction Transistor (BJT) or the like.

In FIG. 8, the positive electrode 801*a* and the negative electrode 801*b* of the DC power supply 801 connect to the first input 807*a* and the second input 807*b* of the bridge 807, respectively. The first output 807*c* of the bridge 807 connects to the first end 835*a* of the DC blocking capacitor 835. The second end 835*b* of the DC blocking capacitor 835 connects to the first end 810*a* of the primary windings of the first transformer 810. In some embodiments, the first output 807*c* directly connects to the first end 810*a* of the primary windings of the first transformer 810. The second end 810*b* of the primary windings of the first transformer 810 connects to the second output 807*d* of the bridge 807. The first end 810*c* of the secondary windings of the first transformer 810 connects to the anode 820*a* of the first diode 820 and the cathode 850*b* of the third diode 850. The second end 810*d* of the secondary windings of the first transformer 810 connects to the drain terminal 870*a* of the first switch element 870 and the source terminal 896*b* of the first auxiliary switch element 896. The cathode 820*b* of the first diode 820 connects to the cathode 830*b* of the second diode 830 as a first output of the DC to DC boost converter 802.

The first end 840*c* of the secondary windings of the second transformer 840 connects to the drain terminal 896*a* of the first auxiliary switch element 896. The second end 840*d* of the secondary windings of the second transformer 840 connects to the drain terminal 897*a* of the second auxiliary switch element 897. The source terminal 870*b* of the first switch element 870 connects to the source terminal 880*a* of the second switch element 880. The source terminal 897*b* of the second auxiliary switch element 897 connects to the drain terminal 880*b* of the second switch element 880, the cathode 860*b* of the fourth diode 860, and the anode 830*a* of the second diode 830. The cathode 850*b* of the third diode 850 connects to the anode 820*a* of the first diode 820 and the first end 810*c* of the secondary windings of the first transformer 810. The anode 850*a* of the third diode 850 and the anode 860*a* of the fourth diode 860 connect to the ground (or the reference) as a second output of the DC to DC boost converter 802. It will be appreciated that the first and the second output of the DC to DC boost converter 802 can be bidirectional and can connect to an inverter (e.g., the inverter circuit 104 shown in FIG. 1A).

A controller (for example, the controller 106 shown in FIG. 1A) can control the switch elements (870 and 880) and the auxiliary switches (896 and 897) based on a plurality of parameters sensed by a plurality of sensors (not shown) and sent to the controller. In operation, the bridge 807 is configured to drive the primary windings of the first transformer 810.

Based on the sensed parameters, when a first boosted voltage, a medium (or low) voltage, for example, 150 volts or 170 volts, is needed corresponding to a medium (or low) speed requirement of the variable speed electric machine, the controller can turn both the switch elements 870 and 880 on and turn both the auxiliary switches 896 and 897 off (during the time when the first boosted voltage is needed). It will be appreciated that when the switch elements 870 and 880 are, for example, MOSFET switches, when the first boosted voltage is needed, the controller can control or command the switch elements 870 and/or 880 so that one switch element is on and the body diode of the other switch element is used to conduct current. The first boost circuit 804 can boost the input DC voltage (for example, 12 volts) to the first boosted voltage (for example, 150 volts or 170 volts). The transformation ratio (i.e., the winding turns ratio) of the first transformer 810 is designed to boost the voltage. In such scenarios, the secondary windings of the second transformer 840 are shorted out from the circuit (i.e. not used).

In operation, based on the sensed parameters, when a second boosted voltage, a high voltage, for example, 300 volts or 340 volts, is needed corresponding to a high speed requirement of the variable speed electric machine, the controller can control the switch elements (870 and 880) and the auxiliary switches (896 and 897) so that the first boost circuit 804 and the second boost circuit 805 can boost the input DC voltage (for example, 12 volts) to the second boosted voltage (for example, 300 volts or 340 volts). In such scenarios, the secondary windings of the first transformer 810 and the secondary windings of the second transformer 840 are connected (or used) in series. During boosting, the controller can control or command the switch elements 870 and/or 880 so that both the switch element 870 and the switch element 880 are off and both the auxiliary switches 896 and 897 are on. It will be appreciated that when the auxiliary switches 896 and 897 are, for example, MOSFET switches, when the second boosted voltage is needed, the controller can control or command the auxiliary switches 896 and/or 897 so that one auxiliary switch is on and the body diode of the other auxiliary switch is used to conduct current.

Compared with using one boost circuit for high voltage and another boost circuit for low voltage, the design shown in FIGS. 7A, 7B, and 8 can save parts (for example, transformer) since the cost and/or weight of transformers can be high. When the first boosted voltage is needed, by controlling the switch elements (770 and 780, or 870 and 880) to both on, the second boost stage (including the secondary windings of the second transformer) can be shorted out. The transformers can be designed for an optimal transformation ratio (i.e., the winding turns ratio). One advantage of using transformer(s) is that the secondary circuit can be isolated from the primary circuit.

It will be appreciate that the embodiment shown in FIGS. 7A, 7B, and 8 can be extended to nth degree. For example, the DC to DC boost converter can include a third boost circuit. Similar to the second boost circuit 705 or 805, the third boost circuit can include a third transformer, a fifth diode, a sixth diode, a third switch element, a fourth switch element, and/or a third auxiliary switch element, and/or a fourth auxiliary switch element. In some embodiments, the third boost circuit can further include a diode and/or a RC snubber. It will be appreciated that the addition of new boost circuit(s) can go further to get a whole range of boosted voltages for a whole range of speeds/loads of the variable speed electric machine.

ASPECTS

It is to be appreciated that any of aspects 1-8 can be combined with any of aspects 9-15, and that any of aspects 9-15 can be combined with aspect 16-20.

Aspect 1. A DC to DC boost converter for a climate system, comprising:
 a first boost circuit having a first electromagnetic coil;
 a second boost circuit having a second electromagnetic coil; and
 a switch set, the switch set operable in a first voltage state and a second voltage state,
 wherein the first electromagnetic coil is connected to the second electromagnetic coil in series when the switch set operates in the second voltage state,
 wherein when the switch set operates in the first voltage state, the first boost circuit is configured to boost an input DC voltage to a first boosted voltage,
 wherein when the switch set operates in the second voltage state, the first boost circuit and the second boost circuit are configured to boost the input DC voltage to a second boosted voltage, and
 wherein the first boosted voltage is different from the second boosted voltage.

Aspect 2. The DC to DC boost converter according to aspect 1, wherein the first boost circuit includes a first bridge circuit, the first electromagnetic coil being a first transformer, and the first bridge circuit drives primary windings of the first transformer,
 wherein the second boost circuit includes a second bridge circuit and the switch set, the second electromagnetic coil being a second transformer, the second bridge circuit drives primary windings of the second transformer.

Aspect 3. The DC to DC boost converter according to aspect 2, wherein the switch set includes a first switch and a second switch,
 wherein when both the first switch and the second switch are ON, the switch set operates in the first voltage state, and the first bridge circuit and the first transformer are configured to boost the input DC voltage to the first boosted voltage,
 wherein when one of the first switch and the second switch is ON and the other of the first switch and the second switch is OFF, secondary windings of the first transformer and secondary windings of the second transformer are configured to work in series, the switch set operates in the second voltage state, and the first bridge circuit, the first transformer, the second bridge circuit, and the second transformer are configured to boost the input DC voltage to the second boosted voltage.

Aspect 4. The DC to DC boost converter according to any one of aspects 1-3, wherein the switch set includes a first set of MOSFET switches.

Aspect 5. The DC to DC boost converter according to any one of aspects 1-4, further comprising: a third boost circuit having a third electromagnetic coil, the switch set operable in a third voltage state;
 wherein the first electromagnetic coil, the second electromagnetic coil, and the third electromagnetic coil are connected in series when the switch set operates in the third voltage state;
 wherein when the switch set operates in the third voltage state, the first boost circuit, the second boost circuit, and the third boost circuit are configured to boost the input DC voltage to a third boosted voltage that is different from the first boosted voltage and the second boosted voltage.

Aspect 6. The DC to DC boost converter according to any one of aspects 1, wherein
 the switch set includes a first set of switches and a second set of switches,
 the first set of switches is within the first boost circuit,
 the second set of switches is within the second boost circuit.
 when the switch set operates in the second voltage state, the first set of switches are off, thereby the first boost circuit and the second boost circuit are configured to boost the input DC voltage to the second boosted voltage,
 when the switch set operates in the first voltage state, the second set of switches are off, thereby the first boost circuit is configured to boost the input DC voltage to the first boosted voltage.

Aspect 7. The DC to DC boost converter according to aspect 6, wherein the first electromagnetic coil and the second electromagnetic coil are inductors.

Aspect 8. The DC to DC boost converter according to aspect 6, further comprising:
 a DC link capacitor having a first end and a second end,
 wherein the first electromagnetic coil has a first end and a second end;
 wherein the second electromagnetic coil has a first end and a second end;
 wherein the first set of switches includes a first switch element and a second switch element, the second set of switches includes a third switch element and a fourth switch element
 wherein the drain terminal of the second switch element and the drain terminal of the fourth switch element connect to the first end of the DC link capacitor;
 wherein the source terminal of the first switch element and the source terminal of the third switch element connect to the second end of the DC link capacitor
 wherein the drain terminal of the third switch element and the source terminal of the fourth switch element connect to the second end of the second electromagnetic coil; and
 wherein the second end of the first electromagnetic coil, the drain terminal of the first switch element, and the source terminal of the second switch element connect to the first end of the second electromagnetic coil.

Aspect 9. An inverter-converter system for a climate system, comprising:
 a DC to DC boost converter, the DC to DC boost converter includes:
  a first boost circuit having a first electromagnetic coil,
  a second boost circuit having a second electromagnetic coil, and
  a switch set, the switch set operable in a first voltage state and a second voltage state,
  wherein the first electromagnetic coil is connected to the second electromagnetic coil in series when the switch set operates in the second voltage state, wherein when the switch set operates in the first voltage state, the first boost circuit is configured to boost an input DC voltage to a first boosted voltage, wherein when the switch set operates in the second voltage state, the first boost circuit and the second boost circuit are configured to boost the input DC voltage to a second boosted voltage, and wherein the first boosted voltage is different from the second boosted voltage;

a DC source providing the input DC voltage to the DC to DC boost converter;

a variable speed electric machine; and a controller that determines a load of the variable speed electric machine and controls the switch set based on the sensed load of the variable speed electric machine, wherein the DC to DC boost converter is configured to source one of the first boosted voltage and the second boosted voltage to the variable speed electric machine based on the sensed load of the variable speed electric machine.

Aspect 10. The inverter-converter system according to aspect 9, wherein the first boost circuit includes a first bridge circuit, the first electromagnetic coil being a first transformer, and the first bridge circuit drives primary windings of the first transformer, wherein the second boost circuit includes a second bridge circuit and the switch set, the second electromagnetic coil being a second transformer, the second bridge circuit drives primary windings of the second transformer, and the switch set includes a first switch and a second switch, wherein when both the first switch and the second switch are ON, the switch set operates in the first voltage state, and the first bridge circuit and the first transformer are configured to boost the input DC voltage to the first boosted voltage, wherein when one of the first switch and the second switch is ON and the other of the first switch and the second switch is OFF, secondary windings of the first transformer and secondary windings of the second transformer are configured to work in series, the switch set operates in the second voltage state, and the first bridge circuit, the first transformer, the second bridge circuit, and the second transformer are configured to boost the input DC voltage to the second boosted voltage.

Aspect 11. The inverter-converter system according to aspect 9, wherein the first electromagnetic coil and the second electromagnetic coil are inductors, the switch set includes a first set of switches and a second set of switches, the first set of switches is within the first boost circuit, the second set of switches is within the second boost circuit, wherein when the switch set operates in the second voltage state, the first set of switches are off, thereby the first electromagnetic coil and the second electromagnetic coil are configured to work in series, and the first boost circuit and the second boost circuit are configured to boost the input DC voltage to the second boosted voltage, wherein when the switch set operates in the first voltage state, the second set of switches are off, thereby the first boost circuit is configured to boost the input DC voltage to the first boosted voltage.

Aspect 12. The inverter-converter system according to any one of aspects 9-11, further comprising:

an inverter circuit for converting one of the first boosted voltage and the second boosted voltage to an AC voltage, wherein the variable speed electric machine is driven by the AC voltage.

Aspect 13. The inverter-converter system according to any one of aspects 9-12, wherein the input DC voltage is about 12 volts, the first boosted voltage is about 170 volts, and the second boosted voltage is about 340 volts.

Aspect 14. The inverter-converter system according to any one of aspects 9-13, wherein the DC source is one of a battery source, a DC source, and a rectified AC source.

Aspect 15. The inverter-converter system according to any one of aspects 9-14, wherein the variable speed electric machine is a multi-speed AC-driven compressor.

Aspect 16. A method for operating a DC to DC boost converter, the DC to DC boost converter including a first boost circuit having a first electromagnetic coil; a second boost circuit having a second electromagnetic coil; and a switch set, the switch set operable in a first voltage state and a second voltage state, wherein the first electromagnetic coil is connected to the second electromagnetic coil in series when the switch set operates in the second voltage state, the method comprising:

receiving an input DC voltage from a DC source;

sensing a load of a variable speed electric machine;

when the load of the variable speed electric machine is sensed to require a first boosted voltage, operating the switch set in the first voltage state and the first boost circuit boosting the input DC voltage to the first boosted voltage; and when the load of the variable speed electric machine is sensed to require a second boosted voltage, operating the switch set in the second voltage state and the first boost circuit combined with the second boost circuit boosting the input DC voltage to the second boosted voltage, wherein the first boosted voltage is different from the second boosted voltage.

Aspect 17. The method according to aspect 16, wherein the first boost circuit includes a first bridge circuit, the first electromagnetic coil being a first transformer, the second boost circuit includes a second bridge circuit and the switch set, the switch set includes a first switch and a second switch, and the second electromagnetic coil being a second transformer, the method further comprising:

the first bridge circuit driving primary windings of the first transformer, the second bridge circuit driving primary windings of the second transformer, operating the switch set in the first voltage state when both the first switch and the second switch are ON, and the first bridge circuit and the first transformer boosting the input DC voltage to the first boosted voltage, operating the switch set in the second voltage state when one of the first switch and the second switch is ON and the other of the first switch and the second switch is OFF, secondary windings of the first transformer and secondary windings of the second transformer working in series, and the first bridge circuit, the first transformer, the second bridge circuit, and the second transformer boosting the input DC voltage to the second boosted voltage.

Aspect 18. The method according to aspect 16, wherein the first electromagnetic coil and the second electromagnetic coil are inductors, the switch set includes a first set of switches and a second set of switches, the first set of switches is within the first boost circuit, and the second set of switches is within the second boost circuit, the method further comprising:
  operating the switch set in the second voltage state when the first set of switches are off, thereby the first electromagnetic coil and the second electromagnetic coil working in series, and the first boost circuit and the second boost circuit boosting the input DC voltage to the second boosted voltage,
  operating the switch set in the first voltage state when the second set of switches are off, thereby the first boost circuit boosting the input DC voltage to the first boosted voltage.

Aspect 19. The method according to any one of aspects 16-18, wherein the DC to DC boost converter further includes a third boost circuit having a third electromagnetic coil, the switch set operable in a third voltage state, wherein the first electromagnetic coil and the second electromagnetic coil are connected to the third electromagnetic coil in series when the switch set operates in the third voltage state, the method further comprising:
  when the load of the variable speed electric machine is sensed to require a third boosted voltage, operating the switch set in the third voltage state, and the first boost circuit and the second boost circuit combined with the third boost circuit boosting the input DC voltage to the third boosted voltage.

Aspect 20. The method according to any one of aspects 16-19, further comprising:
  determining a flux weakening point for the load of the variable speed electric machine; and
  determining the first and second boosted voltages based on the flux weakening point.

What is claimed is:

1. A DC to DC boost converter for a climate system, comprising:
  a first boost circuit having a first electromagnetic coil;
  a second boost circuit having a second electromagnetic coil; and
  a switch set, the switch set operable in a first voltage state and a second voltage state,
  wherein the first electromagnetic coil is connected to the second electromagnetic coil when the switch set operates in the second voltage state,
  wherein when the switch set operates in the first voltage state, the first boost circuit is configured to boost an input DC voltage to a first boosted voltage,
  wherein when the switch set operates in the second voltage state, the first boost circuit and the second boost circuit are configured to boost the input DC voltage to a second boosted voltage,
  wherein the first boosted voltage is different from the second boosted voltage,
  wherein the first boost circuit includes a first bridge circuit, the first electromagnetic coil being a first transformer, and the first bridge circuit drives primary windings of the first transformer, and
  wherein the second boost circuit includes a second bridge circuit and the switch set, the second electromagnetic coil being a second transformer, the second bridge circuit drives primary windings of the second transformer.

2. The DC to DC boost converter according to claim 1, wherein the switch set includes a first switch and a second switch,
  wherein when both the first switch and the second switch are ON, the switch set operates in the first voltage state, and the first bridge circuit and the first transformer are configured to boost the input DC voltage to the first boosted voltage,
  wherein when one of the first switch and the second switch is ON and the other of the first switch and the second switch is OFF, secondary windings of the first transformer and secondary windings of the second transformer are configured to work in series, the switch set operates in the second voltage state, and the first bridge circuit, the first transformer, the second bridge circuit, and the second transformer are configured to boost the input DC voltage to the second boosted voltage.

3. The DC to DC boost converter according to claim 1, wherein the switch set includes a first set of MOSFET switches.

4. The DC to DC boost converter according to claim 1, further comprising: a third boost circuit having a third electromagnetic coil, the switch set operable in a third voltage state;
  wherein the first electromagnetic coil, the second electromagnetic coil, and the third electromagnetic coil are connected in series when the switch set operates in the third voltage state;
  wherein when the switch set operates in the third voltage state, the first boost circuit, the second boost circuit, and the third boost circuit are configured to boost the input DC voltage to a third boosted voltage that is different from the first boosted voltage and the second boosted voltage.

5. The DC to DC boost converter according to claim 1, wherein
  the switch set includes a first set of switches and a second set of switches,
  the first set of switches is within the first boost circuit,
  the second set of switches is within the second boost circuit,
  when the switch set operates in the second voltage state, the first set of switches are off, thereby the first boost circuit and the second boost circuit are configured to boost the input DC voltage to the second boosted voltage,
  when the switch set operates in the first voltage state, the second set of switches are off, thereby the first boost circuit is configured to boost the input DC voltage to the first boosted voltage.

6. The DC to DC boost converter according to claim 5, further comprising:
  a DC link capacitor having a first end and a second end,
  wherein the first electromagnetic coil has a first end and a second end;
  wherein the second electromagnetic coil has a first end and a second end;
  wherein the first set of switches includes a first switch element and a second switch element, the second set of switches includes a third switch element and a fourth switch element;
  wherein the drain terminal of the second switch element and the drain terminal of the fourth switch element connect to the first end of the DC link capacitor;
  wherein the source terminal of the first switch element and the source terminal of the third switch element connect to the second end of the DC link capacitor;

wherein the drain terminal of the third switch element and the source terminal of the fourth switch element connect to the second end of the second electromagnetic coil; and wherein the second end of the first electromagnetic coil, the drain terminal of the first switch element, and the source terminal of the second switch element connect to the first end of the second electromagnetic coil.

7. An inverter-converter system for a climate system, comprising:
a DC to DC boost converter, the DC to DC boost converter includes:
a first boost circuit having a first electromagnetic coil,
a second boost circuit having a second electromagnetic coil, and
a switch set, the switch set operable in a first voltage state and a second voltage state,
wherein the first electromagnetic coil is connected to the second electromagnetic coil when the switch set operates in the second voltage state,
wherein when the switch set operates in the first voltage state, the first boost circuit is configured to boost an input DC voltage to a first boosted voltage,
wherein when the switch set operates in the second voltage state, the first boost circuit and the second boost circuit are configured to boost the input DC voltage to a second boosted voltage,
wherein the first boosted voltage is different from the second boosted voltage,
wherein the first boost circuit includes a first bridge circuit, the first electromagnetic coil being a first transformer, and the first bridge circuit drives primary windings of the first transformer, and
wherein the second boost circuit includes a second bridge circuit and the switch set, the second electromagnetic coil being a second transformer, the second bridge circuit drives primary windings of the second transformer;
a DC source providing the input DC voltage to the DC to DC boost converter;
a variable speed electric machine; and
a controller that determines a load of the variable speed electric machine and controls the switch set based on the sensed load of the variable speed electric machine,
wherein the DC to DC boost converter is configured to source one of the first boosted voltage and the second boosted voltage to the variable speed electric machine based on the sensed load of the variable speed electric machine.

8. The inverter-converter system according to claim 7, wherein the switch set includes a first switch and a second switch,
wherein when both the first switch and the second switch are ON, the switch set operates in the first voltage state, and the first bridge circuit and the first transformer are configured to boost the input DC voltage to the first boosted voltage,
wherein when one of the first switch and the second switch is ON and the other of the first switch and the second switch is OFF, secondary windings of the first transformer and secondary windings of the second transformer are configured to work in series, the switch set operates in the second voltage state, and the first bridge circuit, the first transformer, the second bridge circuit, and the second transformer are configured to boost the input DC voltage to the second boosted voltage.

9. The inverter-converter system according to claim 7, wherein the switch set includes a first set of switches and a second set of switches, the first set of switches is within the first boost circuit, the second set of switches is within the second boost circuit,
wherein when the switch set operates in the second voltage state, the first set of switches are off, thereby the first electromagnetic coil and the second electromagnetic coil are configured to work in series, and the first boost circuit and the second boost circuit are configured to boost the input DC voltage to the second boosted voltage,
wherein when the switch set operates in the first voltage state, the second set of switches are off, thereby the first boost circuit is configured to boost the input DC voltage to the first boosted voltage.

10. The inverter-converter system according to claim 7, further comprising:
an inverter circuit for converting one of the first boosted voltage and the second boosted voltage to an AC voltage,
wherein the variable speed electric machine is driven by the AC voltage.

11. The inverter-converter system according to claim 7, wherein the input DC voltage is about 12 volts, the first boosted voltage is about 170 volts, and the second boosted voltage is about 340 volts.

12. The inverter-converter system according to claim 7, wherein the DC source is one of a battery source, a DC source, and a rectified AC source.

13. The inverter-converter system according to claim 7, wherein the variable speed electric machine is a multi-speed AC-driven compressor.

14. A method for operating a DC to DC boost converter, the DC to DC boost converter including a first boost circuit having a first electromagnetic coil; a second boost circuit having a second electromagnetic coil; and a switch set, the switch set operable in a first voltage state and a second voltage state, wherein the first electromagnetic coil is connected to the second electromagnetic coil when the switch set operates in the second voltage state, the first boost circuit includes a first bridge circuit, the first electromagnetic coil being a first transformer, the first bridge circuit drives primary windings of the first transformer, the second boost circuit includes a second bridge circuit and the switch set, the second electromagnetic coil being a second transformer, and the second bridge circuit drives primary windings of the second transformer, the method comprising:
receiving an input DC voltage from a DC source;
sensing a load of a variable speed electric machine;
when the load of the variable speed electric machine is sensed to require a first boosted voltage, operating the switch set in the first voltage state and the first boost circuit boosting the input DC voltage to the first boosted voltage; and
when the load of the variable speed electric machine is sensed to require a second boosted voltage, operating the switch set in the second voltage state and the first boost circuit combined with the second boost circuit boosting the input DC voltage to the second boosted voltage,
wherein the first boosted voltage is different from the second boosted voltage.

15. The method according to claim 14, wherein the switch set includes a first switch and a second switch, the method further comprising:

operating the switch set in the first voltage state when both the first switch and the second switch are ON, and the first bridge circuit and the first transformer boosting the input DC voltage to the first boosted voltage, operating the switch set in the second voltage state when one of the first switch and the second switch is ON and the other of the first switch and the second switch is OFF, secondary windings of the first transformer and secondary windings of the second transformer working in series, and the first bridge circuit, the first transformer, the second bridge circuit, and the second transformer boosting the input DC voltage to the second boosted voltage.

16. The method according to claim 14, wherein the switch set includes a first set of switches and a second set of switches, the first set of switches is within the first boost circuit, and the second set of switches is within the second boost circuit, the method further comprising:

operating the switch set in the second voltage state when the first set of switches are off, thereby the first electromagnetic coil and the second electromagnetic coil working in series, and the first boost circuit and the second boost circuit boosting the input DC voltage to the second boosted voltage, operating the switch set in the first voltage state when the second set of switches are off, thereby the first boost circuit boosting the input DC voltage to the first boosted voltage.

17. The method according to claim 14, wherein the DC to DC boost converter further includes a third boost circuit having a third electromagnetic coil, the switch set operable in a third voltage state, wherein the first electromagnetic coil and the second electromagnetic coil are connected to the third electromagnetic coil in series when the switch set operates in the third voltage state, the method further comprising:

when the load of the variable speed electric machine is sensed to require a third boosted voltage, operating the switch set in the third voltage state, and the first boost circuit and the second boost circuit combined with the third boost circuit boosting the input DC voltage to the third boosted voltage.

18. The method according to claim 14, further comprising:

determining a flux weakening point for the load of the variable speed electric machine; and determining the first and second boosted voltages based on the flux weakening point.

* * * * *